US012236876B2

(12) United States Patent
Morita

(10) Patent No.: US 12,236,876 B2
(45) Date of Patent: Feb. 25, 2025

(54) DISPLAY DEVICE AND DRIVING METHOD OF DISPLAY DEVICE

(71) Applicant: Japan Display Inc., Tokyo (JP)

(72) Inventor: Tetsuo Morita, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/500,178

(22) Filed: Nov. 2, 2023

(65) Prior Publication Data

US 2024/0161698 A1 May 16, 2024

(30) Foreign Application Priority Data

Nov. 15, 2022 (JP) ................................ 2022-182886

(51) Int. Cl.
*G09G 3/20* (2006.01)
*G09G 3/3233* (2016.01)

(52) U.S. Cl.
CPC ... *G09G 3/3233* (2013.01); *G09G 2300/0426* (2013.01); *G09G 2300/0861* (2013.01); *G09G 2310/0286* (2013.01); *G09G 2330/021* (2013.01)

(58) Field of Classification Search
CPC ............... G09G 3/3233; G09G 3/3266; G09G 2300/0426; G09G 2300/0861; G09G 2310/0286; G09G 2330/021
See application file for complete search history.

(56) References Cited

U.S. PATENT DOCUMENTS 10,916,199 B2 * 2/2021 Zhu ...................... G09G 3/3266
11,238,786 B2 * 2/2022 Byun ................... G09G 3/3233
11,663,952 B2 * 5/2023 Kim ..................... G09G 3/2074 345/690
11,810,517 B2 * 11/2023 Park ..................... G09G 3/3241
11,915,643 B2 * 2/2024 Lu ...................... H10K 59/1315
(Continued)

FOREIGN PATENT DOCUMENTS

KR 1020200086783 A 7/2020
KR 1020220089325 A 6/2022

OTHER PUBLICATIONS

Office Action issued on Jul. 31, 2024, in corresponding Korean Application No. 10-2023-0148796, 13 pages.

*Primary Examiner* — Joe H Cheng
(74) *Attorney, Agent, or Firm* — Maier & Maier, PLLC

(57) ABSTRACT

A display device includes a first transistor controlled using a second control signal obtained by shifting a first control signal and electrically connected between an image data signal line and a first node, a second transistor electrically connected between the first node and a second node, a third transistor controlled using the first control signal and electrically connected between the second node and a gate electrode of the second transistor, a fourth transistor controlled using a fourth control signal obtained by shifting a third control signal and electrically connected between a driving power supply line and the second node, a fifth transistor controlled using the third control signal and electrically connected to the first node, a sixth transistor controlled using the third control signal and electrically connected to a light emitting element and a first electrode of the fifth transistor, and the light emitting element connected to the first electrode.

20 Claims, 32 Drawing Sheets

(56) References Cited

U.S. PATENT DOCUMENTS

| | | | | |
|---|---|---|---|---|
| 2014/0333686 | A1* | 11/2014 | Kim | G09G 3/3233<br>345/82 |
| 2016/0163243 | A1* | 6/2016 | Park | G09G 3/3258<br>345/87 |
| 2016/0284276 | A1 | 9/2016 | Gupta et al. | |
| 2016/0321994 | A1* | 11/2016 | Lee | H10K 59/1216 |
| 2017/0039936 | A1* | 2/2017 | Byun | G09G 3/3233 |
| 2017/0116922 | A1* | 4/2017 | Jung | G09G 3/3258 |
| 2018/0308427 | A1* | 10/2018 | Zhang | G09G 3/3233 |
| 2019/0096327 | A1* | 3/2019 | Peng | G09G 3/3241 |
| 2020/0219450 | A1 | 7/2020 | Lee et al. | |
| 2021/0012711 | A1* | 1/2021 | Huang | G09G 3/3291 |
| 2022/0199020 | A1 | 6/2022 | You | |

* cited by examiner

DISPLAY DEVICE AND DRIVING METHOD OF DISPLAY DEVICE

CROSS-REFERENCE TO RELATED APPLICATIONS

This application claims the benefit of priority to Japanese Patent Application No. 2022-182886 filed on Nov. 15, 2022, the entire contents of which are incorporated herein by reference.

FIELD

An embodiment of the present invention relates to a display device and a driving method of the display device.

BACKGROUND

In recent years, self-luminous display devices have been mounted on televisions, smart phones, digital signage (electronic signboards, electronic advertising boards, and the like) and are becoming popular. The self-luminous display device includes, for example, a plurality of pixels and a driver for driving the plurality of pixels. Each of the plurality of pixels includes, for example, a plurality of transistors, a capacitive element, and a light emitting element. The light emitting element is, for example, a light emitting diode (Light Emitting Diode: LED), a micro light emitting diode (micro LED), or an organic electroluminescence (Electro Luminescence: EL) element. In a self-luminous display device, a driver supplies a voltage to each of a plurality of pixels, so that a current corresponding to the supplied voltage value flows to a light emitting element included in each of the plurality of pixels. Each of the light emitting elements emits light with a luminance corresponding to a current flowing through the light emitting element, and a pixel including the light emitting element can display an image with a gradation corresponding to the luminance.

For example, U.S. Patent Application Publication No. 2016/0284276 discloses a pixel including six transistors, one capacitive element, and one light emitting element, and a self-luminous display device including the pixel. For example, the self-luminous display device described in U.S. Patent Application Publication No. 2016/0284276 can control the light emission of a pixel using four driving circuits, and display an image in a display region.

SUMMARY

A display device according to an embodiment of the present invention includes a first transistor configured to be controlled using a second control signal obtained by shifting a first control signal and electrically connected between an image data signal line and a first node, a second transistor electrically connected between the first node and a second node, a third transistor configured to be controlled using the first control signal and electrically connected between the second node and a gate electrode of the second transistor, a fourth transistor configured to be controlled using a fourth control signal obtained by shifting a third control signal and electrically connected between a driving power supply line and the second node, a fifth transistor configured to be controlled using the third control signal and electrically connected to the first node, a sixth transistor configured to be controlled using the third control signal and electrically connected to a light emitting element and a first electrode of the fifth transistor, and the light emitting element connected to the first electrode.

A driving method of a display device according to an embodiment of the present invention is a driving method of a self-luminous display device including a first transistor electrically connected at least between an image data signal line and a first node, a second transistor electrically connected between the first node and a second node, a third transistor electrically connected between the second node and a gate electrode of the second transistor, a fourth transistor electrically connected to the second node, a fifth transistor electrically connected to the first node, a sixth transistor connected to a light emitting element and a first electrode of the fifth transistor, and the light emitting element is electrically connected to the first electrode, wherein a first control signal and a second control signal are sequentially shifted and output, a third control signal and a fourth control signal are sequentially shifted and output, and the third transistor is configured to be controlled by using the first control signal, the first transistor is configured to be controlled using the second control signal, the fifth transistor and the sixth transistor are configured to be controlled using the third control signal, and the fourth transistor is configured to be controlled using the fourth control signal.

DESCRIPTION OF EMBODIMENTS

Hereinafter, embodiments of the present invention will be described with reference to the drawings and the like. However, the present invention can be implemented in many different aspects, and should not be construed as being limited to the description of the embodiments exemplified below. Further, in order to make the description clearer, the drawings may be schematically represented with respect to the width, thickness, shape, configuration and the like of each part as compared with the actual embodiment. However, the drawings are merely examples, and do not limit the interpretation of the present invention. It should be noted that the terms "first" and "second" for each element are convenient labels used to distinguish each element, and do not have any further meaning unless otherwise described.

Also, in the present specification, the expression "a includes A, B, or C," "a includes any of A, B or C," "a includes one selected from the group consisting of A, B and C," and the like does not exclude cases where a includes a plurality of combinations of A to C unless otherwise specified. Furthermore, these expressions do not exclude the case where a includes other elements.

In a display device having a large number of driving circuits, a ratio of a region (for example, a frame region) in which the driving circuits are arranged in the display device is larger than a ratio of a display region in the display device. That is, the frame region becomes large, and it is difficult to reduce a size of the display device in the display device having the large number of driving circuits.

An object of an embodiment of the present invention is to provide a self-luminous display device capable of narrowing and miniaturizing a frame, and a method of driving a self-luminous display device using the self-luminous display device capable of narrowing and miniaturizing the frame, in view of such problems.

A self-luminous display device according to an embodiment of the present disclosure is, for example, a light emitting device using an EL element as a light emitting element.

1. First Embodiment

[1-1. Overview of the Self-Luminous Display Device 10]

Figure 1:
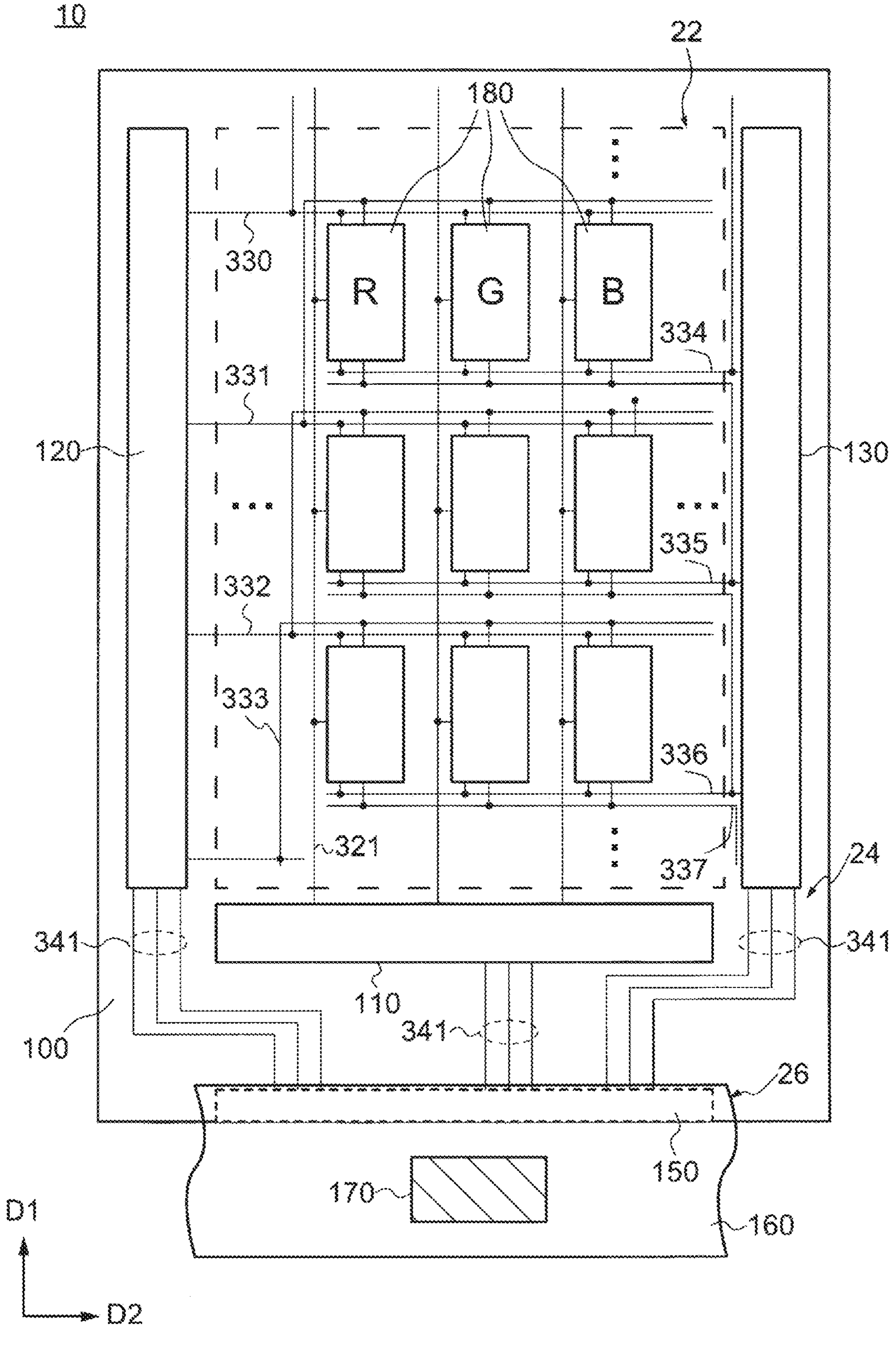
FIG. 1 is a schematic diagram showing a configuration of a self-luminous display device according to a first embodiment of the present invention.
Figure 2:
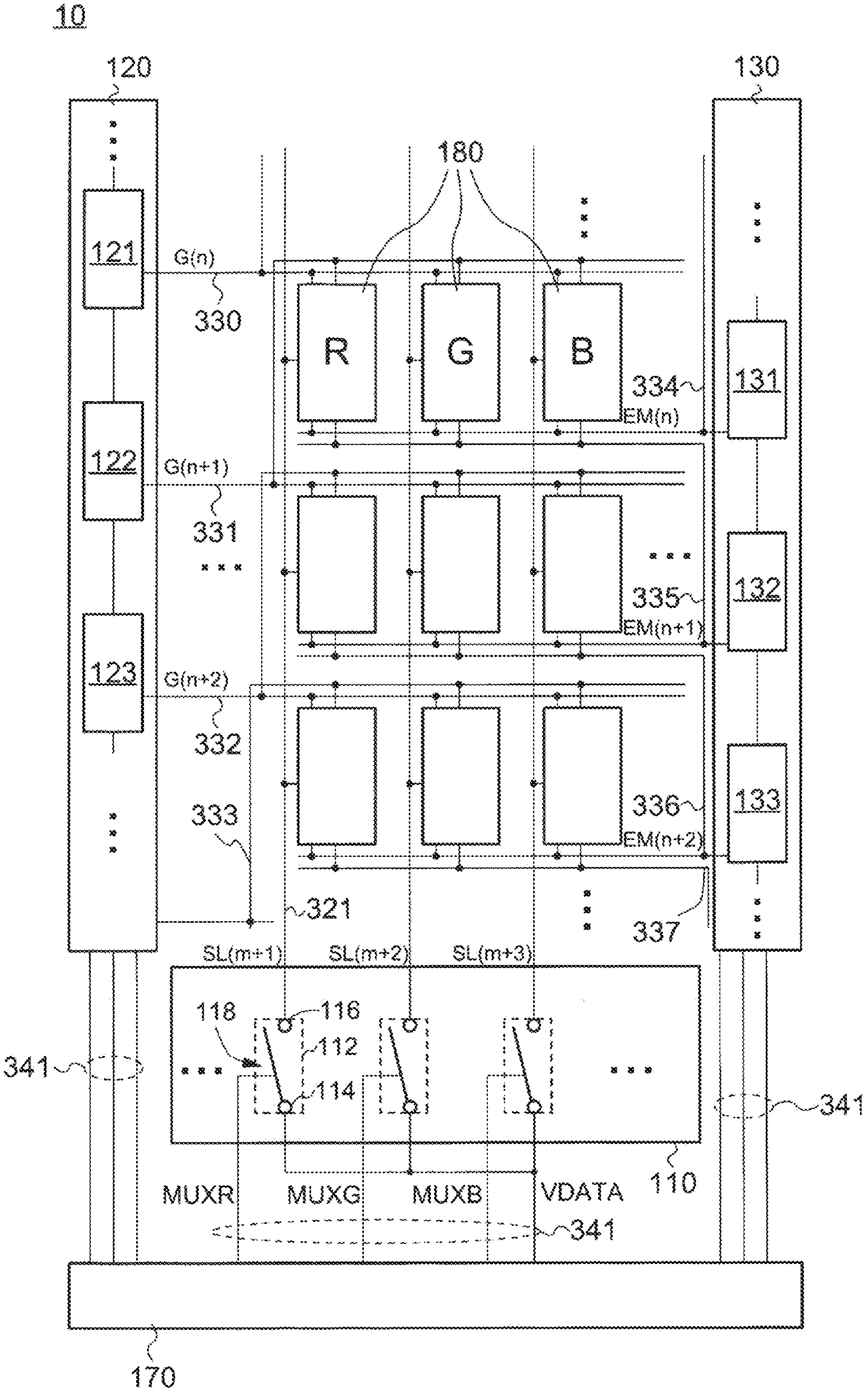
FIG. 2 is a schematic diagram showing the configuration of the self-luminous display device according to the first embodiment of the present invention.

An overview of a self-luminous display device 10 according to a first embodiment will be described with reference to FIG. 1 and FIG. 2. FIG. 1 and FIG. 2 are schematic diagrams showing a configuration of the self-luminous display device 10 according to the first embodiment. The configuration of the self-luminous display device 10 shown in FIG. 1 and FIG. 2 is an example, and the configuration of the self-luminous display device 10 is not limited to the configuration shown in FIG. 1 and FIG. 2.

As shown in FIG. 1 or FIG. 2, the self-luminous display device 10 includes an array substrate 100, a flexible printed circuit substrate 160 (FPC 160), and an IC chip 170. The self-luminous display device 10 includes a display region 22 provided on the array substrate 100, a peripheral region 24 surrounding the display region 22, and a terminal region 26.

A plurality of pixels 180 in the display region 22 are arranged in a matrix. The pixel 180 is the smallest unit constituting a part of the image to be displayed in the display region 22. For example, each of the plurality of pixels 180 may correspond to a sub-pixel R, a sub-pixel G, and a sub-pixel B. One pixel may be formed by three sub-pixels. The arrangement of the pixels 180 is not limited. For example, the arrangement of the plurality of pixels 180 is a stripe arrangement. The arrangement of the self-luminous display device 10 may be a delta arrangement, a pentile arrangement, or the like.

The sub-pixel R, the sub-pixel G, and the sub-pixel B are configured to display images of different colors. For example, each of the sub-pixel R, the sub-pixel G, and the sub-pixel B may include a light emitting element including a light emitting layer that emits three primary colors of red, green, and blue. An arbitrary voltage or current is supplied to each of the three sub-pixels, and the self-luminous display device 10 can display an image.

A source driver circuit 110, a gate driver circuit 120, and a light emission control circuit 130 are provided in the peripheral region 24. Each of the source driver circuit 110, the gate driver circuit 120 and the light emission control circuit 130 is connected to a terminal part 150 using a connection wiring 341. The peripheral region 24 may be referred to as a frame region. The connection wiring 341 may be referred to as the connection wiring 341 alone, and a bundle of a plurality of connection wirings 341 may be referred to as the connection wiring 341.

The terminal part 150 and the FPC 160 electrically connected to the terminal part 150 are provided in the terminal region 26. The terminal region 26 is a region opposed to a region in which the display region 22 is provided with respect to the peripheral region 24 in a first direction D1.

The FPC 160 is connected to an external device (not shown) on an outer side of the self-luminous display device 10. The self-luminous display device is connected to the external device via the FPC 160 and the terminal part 150 connected to FPC. A control signal and a voltage are transmitted from the external device to the self-luminous display device 10 via the FPC 160 and the terminal part 150 connected to FPC. The self-luminous display device 10 drives each pixel 180 provided in the self-luminous display device 10 by using the received control signal and voltage from the external device. As a result, the self-luminous display device 10 can display an image in the display region 22.

For example, the IC tip 170 is provided on the FPC 160. The IC chip 170 supplies signals, voltages, and the like for driving the respective pixels 180 to the source driver circuit 110, the gate driver circuit 120, the light emission control circuit 130 and the pixel 180 (a pixel circuit 181) via the FPC 160, the terminal part 150 and the connecting wire 341.

Each of the source driver circuit 110, the gate driver circuit 120, the light emission control circuit 130 and the IC chip 170 may be referred to as a control circuit alone in the first embodiment, and a circuit group including some or all of the source driver circuit 110, the gate driver circuit 120, the light emission control circuit 130 and the IC chip 170 may be referred to as a control circuit in the first embodiment.

[1-2. Configuration of Source Driver Circuit 110]

Referring to FIG. 1 and FIG. 2, an overview of the source driver circuit 110 will be described. As shown in FIG. 1 or FIG. 2, the source driver circuit 110 is provided at a position adjoining the display region 22 in the first direction D1 (column direction). An image data signal line 321 extends from the source driver circuit 110 in the first direction D1 and is connected to the plurality of pixels 180 arranged in the first direction D1.

As shown in FIG. 2, for example, the source driver circuit 110 includes a plurality of selection circuits 112. For example, each of the plurality of selection circuits 112 is controlled based on an on-signal and an off-signal supplied to a selection signal MUXR, a selection signal MUXG and a selection signal MUXB. The selection circuit 112 is selected by an on-signal provided to a selection signal (for example, the selection signal MUXR). The pixel 180 is electrically connected to the image data signal line 321. In addition, the selection circuit 112 supplies the pixel 180 with an image data signal SL (m+1) including a data signal VDATA supplied to an input terminal 114. For example, the data signal VDATA may include a voltage RDATA (n), a voltage GDATA (n), or a voltage BDATA (n).

For example, the selection circuit 112 is a switch 118 including the input terminal 114 and an output terminal 116. For example, an on-signal supplied from the IC chip 170 to the selection signal MUXR causes the input terminal 114 and the output terminal 116 to be conductive (connected), and the input terminal 114 and the output terminal 116 are cut off (disconnected) by an off-signal supplied from the IC chip 170 to the selection signal MUXR. The on-signal is a signal including a voltage that conducts between the input terminal 114 and the output terminal 116, and the off-signal is a signal including a voltage that blocks the input terminal 114 and the output terminal 116.

The on-signal may be high level (High, HI), the off-signal may be low level (Low, LO) in the present disclosure. Further, the on-signal may be low level (Low, LO), and the off-signal may be high level (High, HI) in the present disclosure.

[1-3. Configuration of Gate Driver Circuit 120]

An overview of the gate driver circuit 120 will be described with reference to FIG. 1 and FIG. 2. As shown in FIG. 1 or FIG. 2, the gate driver circuit 120 is provided at a position adjoining the display region 22 in a second direction D2 (row direction). Scanning signal lines 329, 330, 331, 332 and 333 extend from the gate driver circuit 120 in the second direction D2 and are connected to the plurality of pixels 180 arranged in the second direction D2.

As shown in FIG. 2, the gate driver circuit 120 includes a plurality of shift registers (for example, shift registers 121, 122, and 123). For example, the shift registers 121, 122, and 123 sequentially supply different scanning signals of timing (for example, a scanning signal G (n), a scanning signal G (n+1), a scanning signal G (n+2), and the like) to each of the scanning signal lines 330, 331, 332, and 333 based on a clock signal and a control signal such as a start pulse supplied from the IC chip 170 and have a role of driving the pixel 180 (pixel circuit 181) which is electrically connected to each of the scanning signal lines. The scanning signal G (n) or a scanning signal G (n+2) may be referred to as a first control signal, and the scanning signal G (n+1) may be referred to as a second control signal.

For example, the shift register 121 is electrically connected to the shift register 122 and the shift register 122 is electrically connected to the shift register 123. For example, the shift register 121 is electrically connected to the scanning signal line 330 and supplies the scanning signal G (n) to the scanning signal line 330. Similar to the shift register 121, for example, the shift register 122 is electrically connected to the scanning signal line 331 and supplies the scanning signal G (n+1) to the scanning signal line 331, and the shift register 123 is electrically connected to the scanning signal line 332 and supplies the scanning signal G (n+2) to the scanning signal line 332. In addition, although not shown, a shift register of a next stage electrically connected to the shift register 123 is electrically connected to the scanning signal line 333, and a shift register of a next stage electrically connected to the shift register of the next stage is electrically connected to a scanning signal line different from the scanning signal line described above. The scanning signal G (n+1) includes the same pulse width as the scanning signal G (n), and is a signal in which the scanning signal G (n) is shifted. Similar to the scanning signal G (n+1), the scanning signal G (n+2) includes the same pulse width as the scanning signal G (n+1), and is a signal in which the scanning signal G (n+1) is shifted.

[1-4. Configuration of Light Emission Control Circuit 130]

An overview of the light emission control circuit 130 will be described with reference to FIG. 1 and FIG. 2. As shown in FIG. 1 or FIG. 2, the light emission control circuit 130 is provided adjacent to the display region 22 in the second direction D2 (row direction) and opposite to a position where the gate driver circuit 120 is disposed with respect to the display region 22. Light emission control signal lines 334, 335, 336, and 337 extend from the light emission control circuit 130 in the second direction D2 and are connected to the plurality of pixels 180 (pixel circuits 181) arranged in the second direction D2.

As shown in FIG. 2, the light emission control circuit 130 includes a plurality of shift registers (for example, shift registers 131, 132, and 133). For example, the shift registers 131, 132 and 133 sequentially supply different emission control signals of timing (for example, emission control signal EM (n), the emission control signal EM (n+1), the emission control signal EM (n+2), and the like) to each of the emission control signal lines 334, 335, 336 and 337 based on a control signal such as a clock signal and a start pulse supplied from the IC chip 170, and have a role of driving the pixel 180 (pixel circuit 181) which is electrically connected to each of the emission control signal lines. The light emission control signal EM (n) or the light emission control signal EM (n+2) may be referred to as a third control signal, and the light emission control signal EM (n+1) may be referred to as a fourth control signal.

For example, the shift register 131 is electrically connected to the shift register 132 and the shift register 132 is electrically connected to the shift register 133. For example, the shift register 131 is electrically connected to a light emission control signal line 334 and supplies the light emission control signal EM (n) to the light emission control signal line 334. Similar to the shift register 131, for example, the shift register 132 is electrically connected to the light emission control signal line 335, supplies the light emission control signal EM (n+1) to the light emission control signal line 335, and the shift register 133 is electrically connected to the light emission control signal line 336, and supplies the light emission control signal EM (n+2) to the light emission control signal line 336. The light emission control signal EM (n+1) includes the same pulse width as the light emission control signal EM (n). The light emission control signal EM (n+1) is a signal in which the light emission control signal EM (n) is shifted. Similarly, the light emission control signal EM(n+2) includes the same pulse width as the light emission control signal EM (n+1), and the light emission control signal EM (n+2) is a signal in which the light emission control signal EM (n+1) is shifted.

[1-5. Configuration of Pixel 180]

Figure 3:
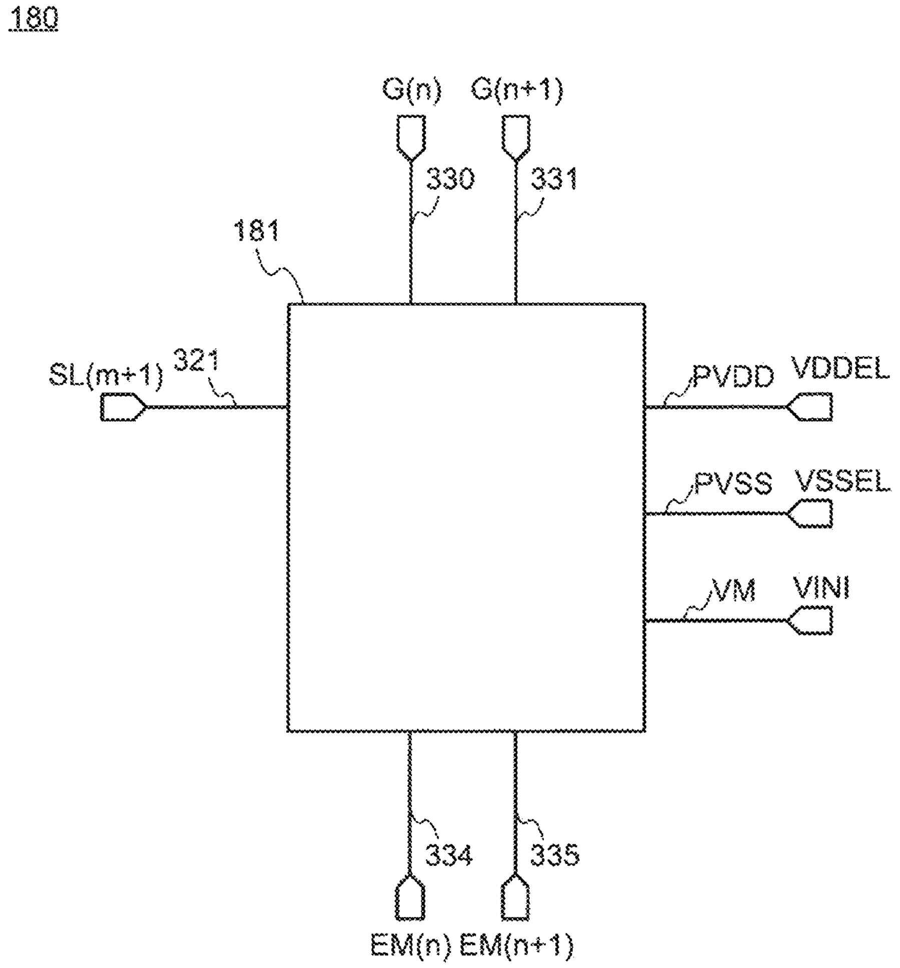
FIG. 3 is a schematic diagram showing an input signal to the pixel circuit according to the first embodiment of the present invention.
Figure 4:
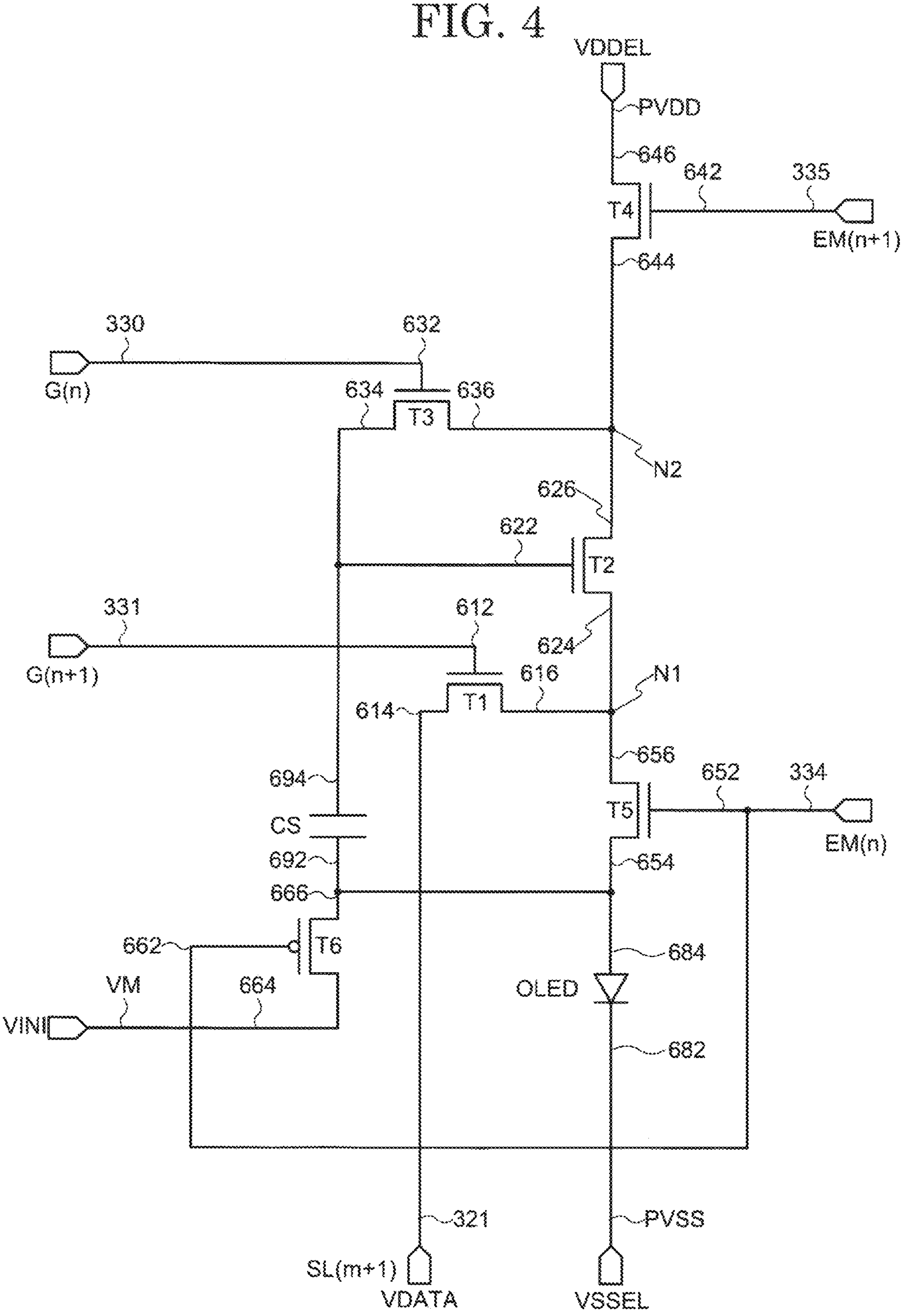
FIG. 4 is a circuit diagram showing a configuration of a pixel circuit according to the first embodiment of the present invention.

Referring to FIG. 3 and FIG. 4, an overview of the pixel 180 will be described. FIG. 3 is a schematic diagram showing an input signal to the pixel circuit 181 included in the pixel 180. FIG. 4 is a circuit diagram showing a configuration of the pixel circuit 181. FIG. 3 and FIG. 4 show, by way of example, the configuration of the pixel circuit 181 of the pixel 180 shown in FIG. 1 and FIG. 2. The configuration of the pixel 180 and the pixel circuit 181 is not limited to the configuration shown in FIG. 3 and FIG. 4. The same or similar configurations as those in FIG. 1 and FIG. 2 will not be described here.

The pixel circuit 181 is a circuit for driving the pixel 180. Pixel circuits of the sub-pixel R, the sub-pixel G, and the sub-pixel B included in the pixel 180 are the same as those of the pixel circuit 181, and differ in colors emitted by light emitting elements OLED. In the following explanation, a light emitting element OLED that emits red will be mainly described.

As shown in FIG. 3, the pixel circuit 181 is supplied with the scanning signal G (n), the scanning signal G (n+1), the image data signal SL (m+1), the light emission control signal EM (n), the light emission control signal EM (n+1), and an initialization voltage VINI. Further, as a power source for driving the pixel 180, a driving voltage VDDEL and a reference voltage VSSEL are supplied to the pixel circuit 181.

The initialization voltage VINI is supplied to an initialization voltage line VM, the driving voltage VDDEL is supplied to a driving power line PVDD, and the reference voltage VSSEL is supplied to a reference voltage line PVSS. For example, each of the initialization voltage line VM, the driving power supply line PVDD and the reference voltage line PVSS may be electrically connected to the different connection line 341 or may be the different connection line 341. The initialization voltage VINI, the driving voltage VDDEL and the reference voltage VSSEL may be supplied from an external circuit to the plurality of pixels 180 (the pixel circuit 181) via the FPC 160, the terminal part 150, the initialization voltage line VM, the driving power supply line PVDD, and the reference voltage line PVSS. The initialization voltage VINI, the driving voltage VDDEL and the reference voltage VSSEL may be supplied from the IC chip 170 to the plurality of pixels 180 (pixel circuits 181) via the FPC 160, the terminal part 150, the initialization voltage line VM, the driving power supply line PVDD and the reference voltage line PVSS. The initialization voltage VINI is smaller than the driving voltage VDDEL. The initialization voltage VINI may be the same as the reference voltage VSSEL. The reference voltage VSSEL is smaller than the driving voltage VDDEL.

As shown in FIG. 4, the pixel circuit 181 includes a first transistor T1, a second transistor T2, a third transistor T3, a fourth transistor T4, a fifth transistor T5, a sixth transistor T6, a capacitor CS and the light emitting element OLED. Each of these transistors includes a gate electrode and a pair of electrodes (a source electrode and a drain electrode) including a first electrode and a second electrode. Each of the capacitor CS and the light emitting element OLED has a pair of electrodes including a first electrode and a second electrode.

For example, the first transistor T1 is a selection transistor. The first transistor T1 has a function of supplying the image data signal SL (m+1) to the second transistor T2.

For example, the second transistor T2 is a driving transistor. The second transistor T2 has a function for causing the light emitting element OLED to emit light by supplying a current to the light emitting element OLED using the inputted image data signal SL (m+1).

The third transistor T3 has a function of conducting a second node N2 and a gate electrode 622 of the second transistor T2 (and a second electrode 694 of the capacitor CS), supplying the driving voltage VDDEL to the gate electrode 622 of the second transistor T2, and resetting the gate electrode 622 of the second transistor T2. The driving voltage VDDEL is a voltage for driving the pixel and is also a reset voltage for resetting the pixel. The third transistor T3 has a function of accumulating charges corresponding to a threshold voltage Vth of the second transistor T2 in the gate electrode 622 of the second transistor T2 and the second electrode 694 of the capacitor CS.

The fourth transistor T4 controls connection and disconnection between the driving power supply line PVDD and the second transistor T2. That is, the fourth transistor T4 has a function of supplying the driving voltage VDDEL to the second transistor T2.

The fifth transistor T5 controls connection and disconnection between the second transistor T2 and the light emitting element OLED. In other words, the fifth transistor T5 has a function of controlling connection and disconnection between the second transistor T2 and the light emitting element OLED, and supplying a current to the light emitting element OLED to control light emission and non-light emission of the light emitting element OLED.

The sixth transistor T6 has a function for supplying a first electrode 654 of the fifth transistor T5, a second electrode 684 of the light emitting element OLED, and a first electrode 692 of the capacitor CS with an initialization voltage VINI, and initializing the first electrode 654 of the fifth transistor T5, the second electrode 684 of the light emitting element OLED, and the first electrode 692 of the capacitor CS.

For example, the capacitor CS has a function for holding a charge (first charge) corresponding to the threshold voltage Vth of the second transistor T2. The capacitor CS has a function for holding charges (second charges) corresponding to data voltages (for example, RDATA (n) (see FIG. 6)) included in the image data signal SL (m+1) input to the gate electrode 622 of the second transistor T2.

The light emitting element OLED has a diode characteristic and has a function for emitting light based on a current flowing through the light emitting element OLED (that is, a drain current of the second transistor T2).

The first transistor T1 includes a gate electrode 612, a first electrode 614, and a second electrode 616. The gate electrode 612 is electrically connected to the scanning signal line 331. The first electrode 614 is electrically connected to the image data signal line 321. The second electrode 616 is electrically connected to a first node N1, a first electrode 624 of the second transistor T2, and the second electrode 656 of the fifth transistor T5. The scanning signal G (n+1) is supplied to the scanning signal line 331. A conduction-state (on-state) and a non-conduction-state (off-state) are controlled by the scanning signal G (n+1) in the first transistor T1. The first transistor T1 becomes non-conductive in the case where the signal supplied to the scanning signal G (n+1) is low level (LO). The first transistor T1 becomes conductive in the case where the signal supplied to the scanning signal G (n+1) is high level (HI).

The second transistor T2 includes the gate electrode 622, the first electrode 624, and a second electrode 626. The gate electrode 622 is electrically connected to a first electrode 634 of the third transistor T3 and the first electrode 694 of the capacitor CS. The second electrode 626 is electrically connected to the second node N2, a second electrode 636 of the third transistor T3, and a first electrode 644 of the fourth transistor T4.

The third transistor T3 includes a gate electrode 632, the first electrode 634, and the second electrode 636. The gate electrode 632 is electrically connected to the scanning signal line 330. The scanning signal G (n) is supplied to the scanning signal line 330. The conduction-state (on-state) and the non-conduction-state (off-state) are controlled by the scanning signal G (n) in the third transistor T3. The third transistor T3 becomes non-conductive in the case where the signal supplied to the scanning signal G (n) is low level (LO). The third transistor T3 becomes conductive in the case where the signal supplied to the scanning signal G (n) is high level (HI).

The fourth transistor T4 includes a gate electrode 642, the first electrode 644, and a second electrode 646. The gate electrode 642 is electrically connected to the light emission control signal line 335. The second electrode 646 is electrically connected to the driving power supply line PVDD. The driving power supply line PVDD is supplied with a drive voltage VDDEL. The light emission control signal EM (n+1) is supplied to the light emission control signal line 335. The conduction-state (on-state) and the non-conduction-state (off-state) are controlled by the light emission control signal EM (n+1) in the fourth transistor T4. The fourth transistor T4 becomes non-conductive in the case where the signal supplied to the light emission control signal EM (n+1) is low level (LO) in the first embodiment, and the fourth transistor T4 becomes conductive in the case where the signal supplied to the light emission control signal EM (n+1) is high level (HI) in the first embodiment.

The fifth transistor T5 includes a gate electrode 652, the first electrode 654, and a second electrode 656. The gate electrode 652 is electrically connected to the light emission control signal line 334. The first electrode 654 is electrically connected to a second electrode 666 of the sixth transistor T6, the first electrode 692 of the capacitor CS, and the second electrode 684 of the light emitting element OLED. The light emission control signal EM (n) is supplied to the light emission control signal line 334. The conduction-state (on-state) and the non-conduction-state (off-state) are controlled by the light emission control signal EM (n) in the fifth transistor T5. The fifth transistor T5 becomes non-conductive in the case where the signal supplied to the light emission control signal EM (n) is low level (LO) in the first embodiment, and the fifth transistor T5 becomes conductive in the case where the signal supplied to the light emission control signal EM (n) is high level (HI) in the first embodiment.

The sixth transistor T6 includes a gate electrode 662, a first electrode 664, and the second electrode 666. The gate electrode 662 is electrically connected to the light emission control signal line 334. The first electrode 664 is electrically connected to the initialization voltage line VM. As described above, the light emission control signal EM (n) is supplied to the light emission control signal line 334, and the initialization voltage VINI is supplied to the initialization voltage line VM. Similar to the fifth transistor T5, in the sixth transistor T6, the conductive state (on-state) and the non-conductive state (off-state) are controlled by the light emission control signal EM (n). The sixth transistor T6 becomes conductive in the case where the signal supplied to the light emission control signal EM (n) is low level (LO) in the first embodiment, and the sixth transistor T6 becomes non-conductive in the case where the signal supplied to the light emission control signal EM (n) is high level (HI) in the first embodiment.

A first electrode 682 of the light emitting element OLED is electrically connected to the reference voltage line PVSS. As described above, the reference voltage line PVSS is supplied with the reference voltage VSSEL. For example, the first electrode 682 of the light emitting element OLED is a cathode electrode, and the second electrode 684 of the light emitting element OLED is, for example, an anode electrode.

For example, the conduction-state of the transistor in the self-luminous display device 10 is assumed to indicate a state in which the source electrode and the drain electrode of the transistor are conductive and the transistor is in an on-state (ON), and the non-conduction-state of the transistor in the self-luminous display device 10 is assumed to indicate a state in which the source electrode and the drain electrode of the transistor are non-conductive and the transistor is in an off-state (OFF). Note that in each transistor, the source electrode and the drain electrode may be interchanged depending on a voltage or a potential supplied to each electrode. In addition, it can be easily understood by people skilled in the art that even if the transistor is in the off-state, a small amount of current flows, such as a leakage current.

Each transistor shown in FIG. 4 may have a Group 14 element, such as silicon or germanium, or an oxide exhibiting semiconductor characteristics in a channel region. For example, the channel region of each of the transistors has low-temperature polysilicon (LTPS). In the self-luminous display device 10, the transistors are formed using thin film transistors (TFT). Each transistor may have either an n-channel field effect transistor or a p-channel field effect transistor. In the self-luminous display device 10, a configuration of the transistor, a connection of a storage capacitor, a power supply voltage, and the like may be appropriately adapted according to the application and specifications. In the first embodiment, the first transistor T1 to the fifth transistor T5 are n-channel field effect transistors, and the sixth transistor T6 is a p-channel field effect transistor.

[1-6. Driving Method of Self-Emitting Display Device 10]

Figure 12:
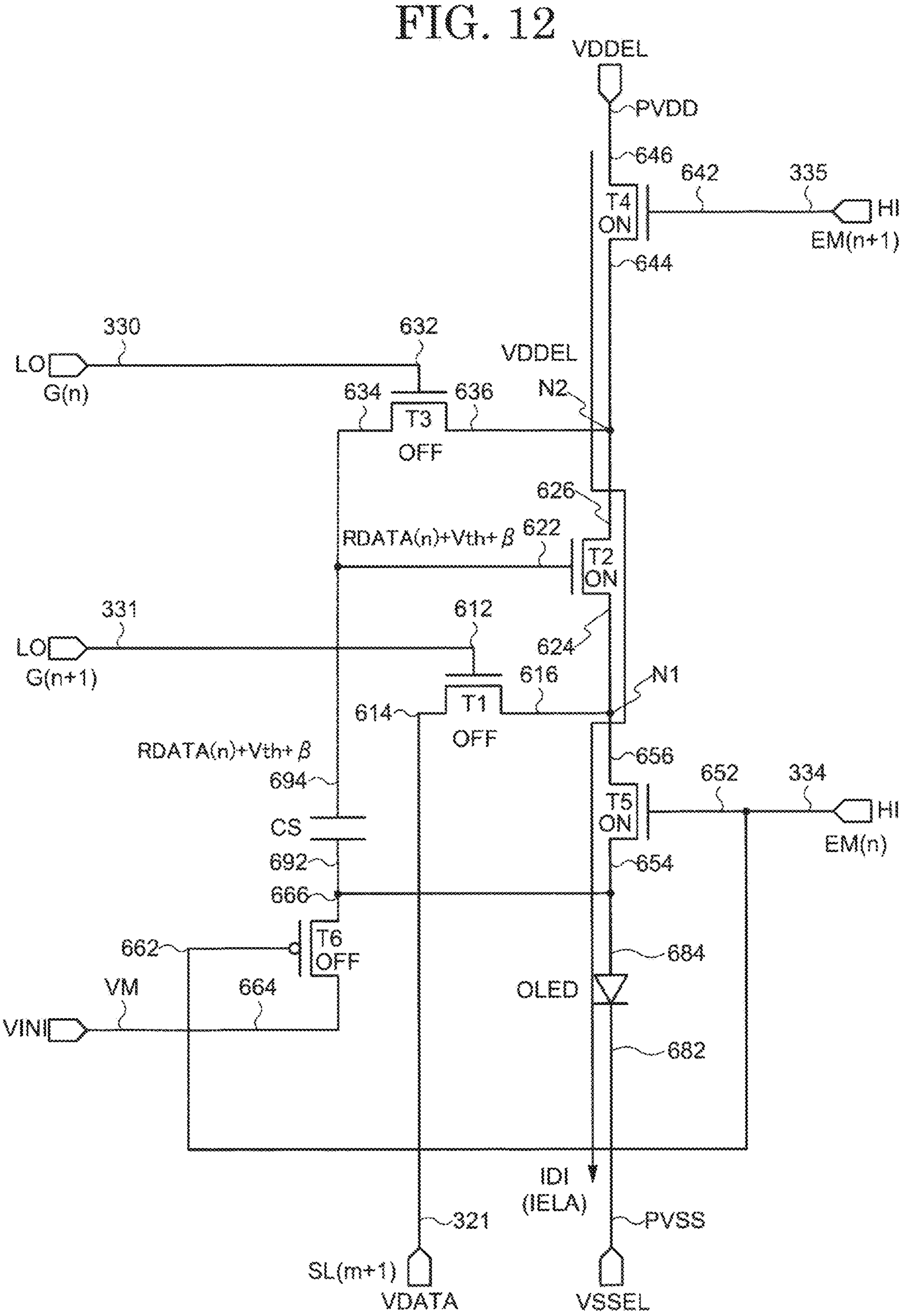
FIG. 12 is a schematic diagram showing an operation-state of the pixel at the timing shown in FIG. 6.
Figure 13:
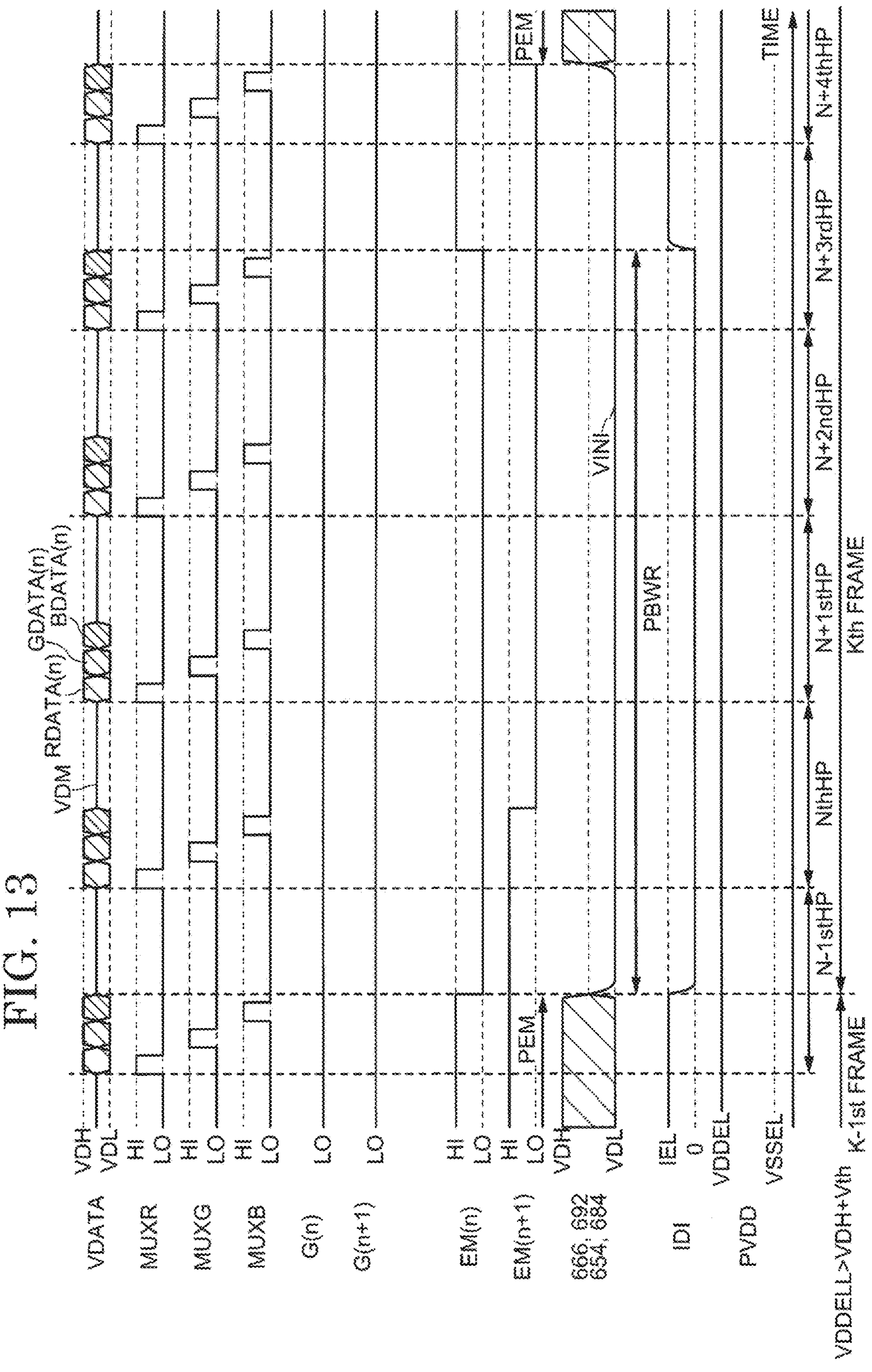
FIG. 13 is a schematic diagram showing a timing chart of the self-luminous display device according to the first embodiment of the present invention.
Figure 14:
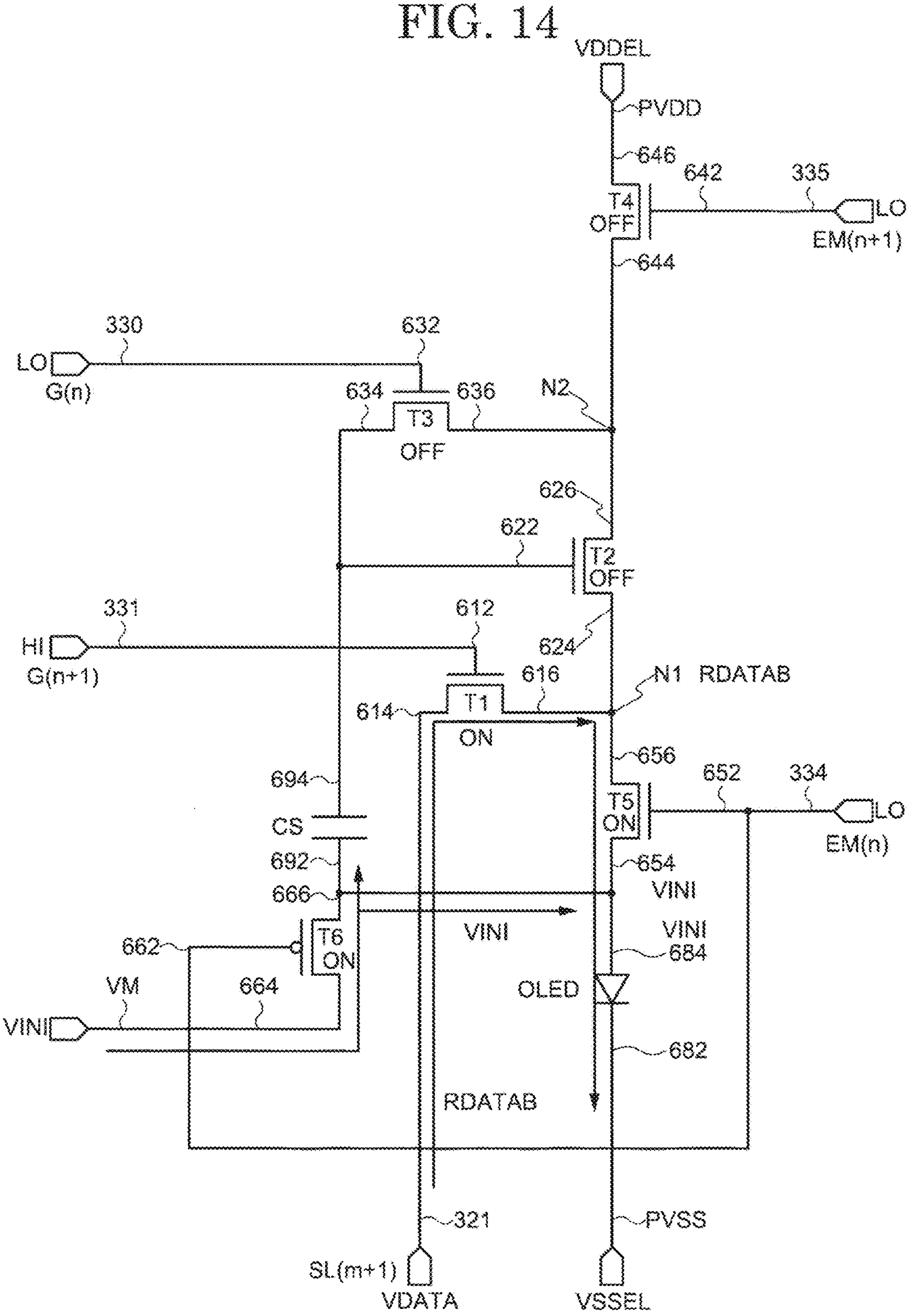
FIG. 14 is a schematic diagram showing an operation-state of the pixel at the timing shown in FIG. 13.

Referring to FIG. 5A to FIG. 14, driving methods of the self-luminous displays 10 will be described. FIG. 5A, FIG. 5B, FIG. 6 and FIG. 13 are schematic diagrams showing a timing chart of the self-emitting display device 10. FIG. 7 to FIG. 12 are schematic diagrams showing an operation-state of the pixel 180 (the pixel circuit 181) at the timing shown in FIG. 6. FIG. 14 is a schematic diagram showing an operation-state of the pixel 180 (the pixel circuit 181) at the timing shown in FIG. 13. The driving method of the self-luminous display device 10 is not limited to the driving method shown in FIG. 5A to FIG. 14. Descriptions of the same or similar configurations as those in FIG. 1 to FIG. 4 will be omitted. The horizontal axis of the timing charts indicates times (TIME).

Figure 5A:
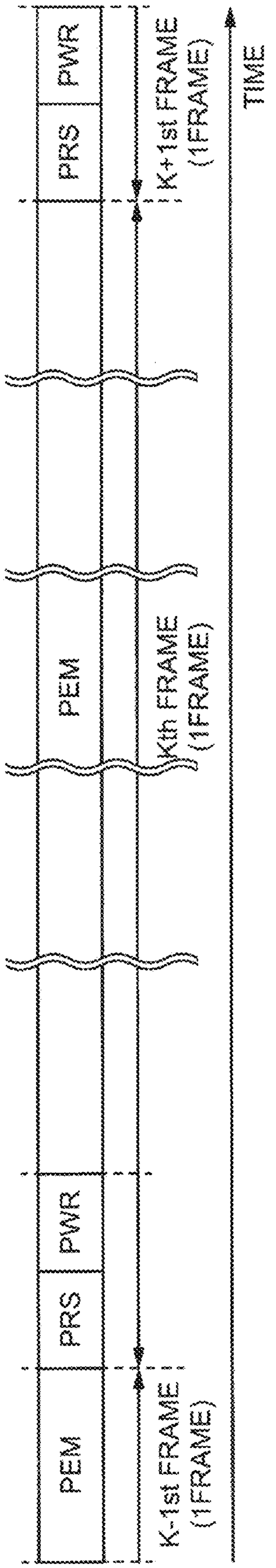
FIG. 5A is a schematic diagram showing a timing chart of the self-luminous display device according to the first embodiment of the present disclosure.

FIG. 5A is an example of a timing chart of a driving method of the self-luminous display device 10 in the case where the self-luminous display device is driven at a high frequency. For example, the high frequency is 60 Hz, and is a frequency at which one frame (1 FRAME) is driven at 60 Hz. For example, a current frame (Kth FRAME), a part of a previous frame of the current frame (K−1st FRAME), and a part of a subsequent frame of the current frame (K+1st FRAME) are shown in FIG. 5A. For example, the driving methods shown in FIG. 5A are referred to as high-frequency driving.

The driving methods of the self-luminous display device 10 include at least a reset period PRS, a sampling period PWR, and a light emission period PEM in one frame as shown in FIG. 5A. The sampling period PWR is executed after the reset period PRS, and the emission period PEM is executed after the sampling period PWR in the pixel 180 (the pixel circuit 181) included in the self-luminous display device 10. Further, after the light emission period PEM of the previous frame of the current frame, the reset period PRS of the current frame is executed, and after the light emission period PEM of the current frame, the reset period PRS and the sampling period PWR of the subsequent frame of the current frame are executed.

Figure 5B:
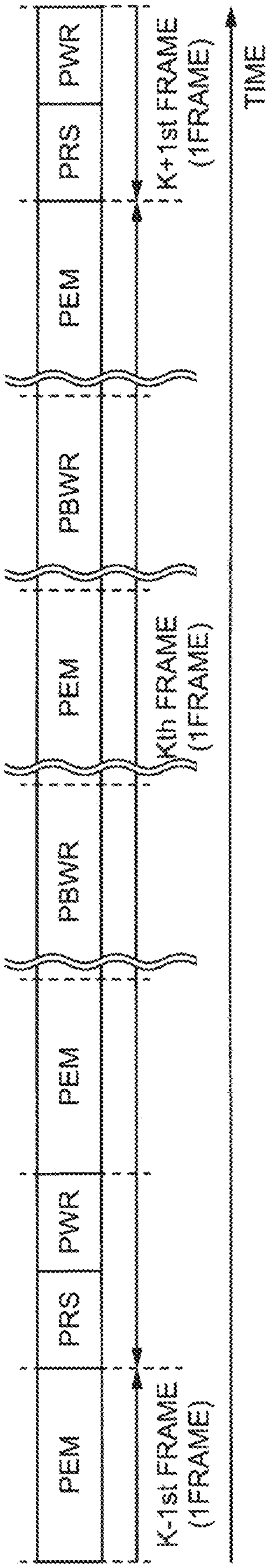
FIG. 5B is a schematic diagram showing a timing chart of the self-luminous display device according to the first embodiment of the present disclosure.

FIG. 5B is an example of a timing chart of a driving process of the self-luminous display device 10 in the case where the self-luminous display device is driven at a low frequency. The low frequency is, for example, 1 Hz, and is a frequency at which one frame (1 FRAME) is driven at 1 Hz. The driving method shown in FIG. 5B is referred to as low-frequency driving, for example. The low-frequency driving is a driving method in which a period for displaying black (black period PBWR) is executed a plurality of times in the light emission period PEM as compared with the high-frequency driving. In the low-frequency driving, the driving other than the black period PBWR is the same as the high-frequency driving.

Figure 6:
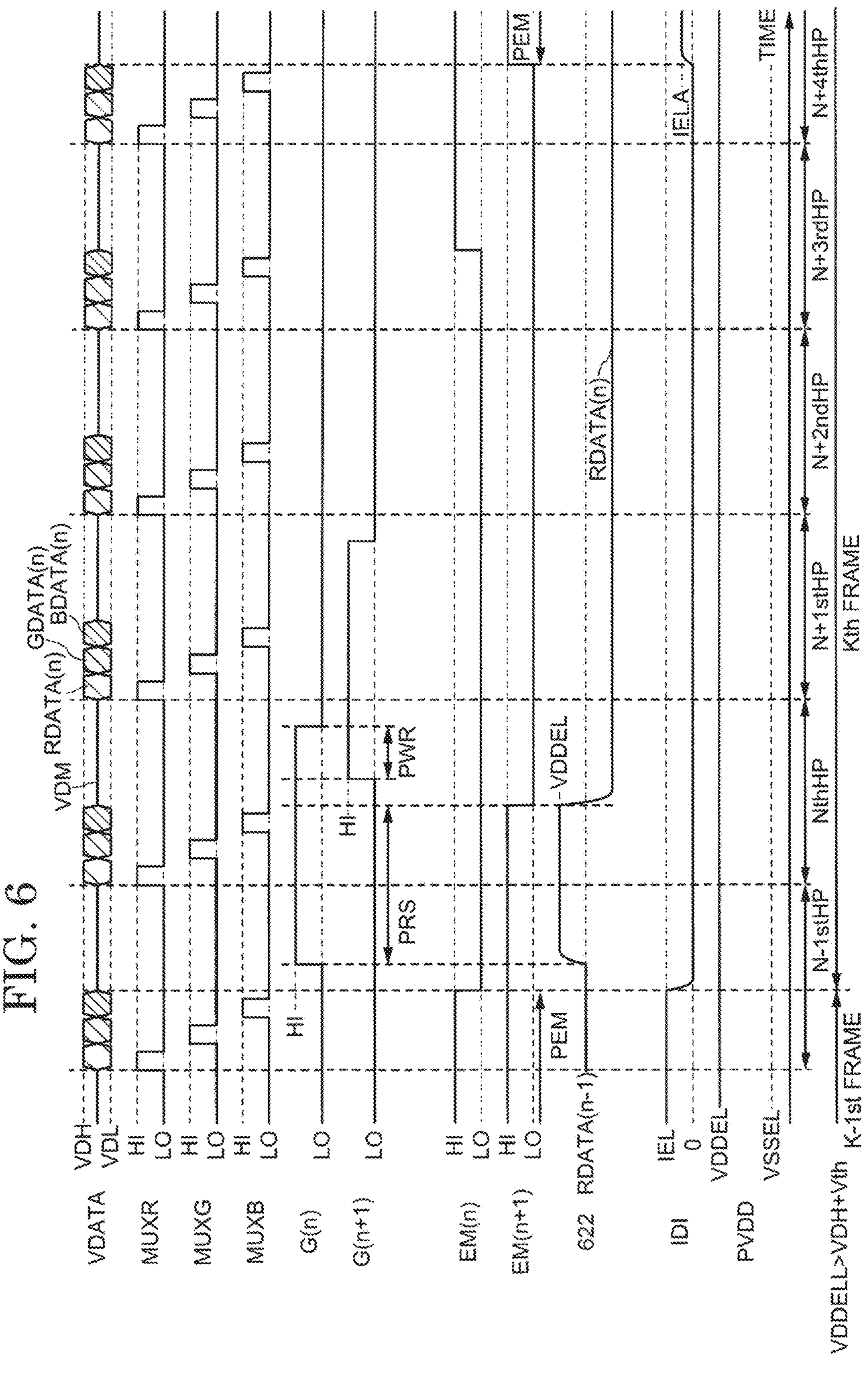
FIG. 6 is a schematic diagram showing a timing chart of the self-luminous display device according to the first embodiment of the present disclosure.

FIG. 6 is a diagram for describing the reset period PRS, the sampling period PWR, and the emission period PEM of the driving methods of the pixels 180 (the pixel circuits 181) of the self-luminous display device 10. FIG. 6 shows the light emission period PEM of the previous frame of the current frame (K−1st FRAME), the reset period PRS, the sampling period PWR, and the light emission period PEM of the current frame (Kth FRAME). Further, FIG. 6 shows a plurality of one horizontal periods (horizontal period N−1st HP, horizontal period Nth HP, horizontal period N+1st HP, horizontal period N+2nd HP, horizontal period N+3rd HP, horizontal period N+4th HP). The one horizontal period is, for example, a period in which the image data signal SL (m+1) including the data signal VDATA is input to a pixel (pixel circuit) electrically connected to one scanning signal line, the image data signal SL (m+1) including the data signal VDATA is input to a pixel (pixel circuit) electrically connected to all the scanning signal lines, and an image of the frame corresponding to 1 FRAME is displayed.

Referring to FIG. 6 to FIG. 12, an example will be described of driving methods in which the pixel 180 (pixel circuit 181) displays an image based on the voltage RDATA (n) included in the data signal VDATA input to the one horizontal period N+1st HP.

First, the data signal VDATA, the selection signal MUXR, the selection signal MUXG, and the selection signal MUXB will be described. The image data signal SL (m+1) including the data signal VDATA is input to each pixel 180 (pixel circuit 181) in accordance with each horizontal period. For example, the data signal VDATA is analog data including a voltage between a voltage VDH and a voltage VDL that is lower than the voltage VDH. A voltage VDM is the voltage between the voltage VDH and the voltage VDL that is lower than the voltage VDH. For example in the respective horizontal periods, the voltage RDATA is selected and supplied to the image data signal line using the selection signal MUXR, the voltage GDATA is selected, and supplied to the image data signal line using the selection signal MUXG, and the voltage BDATA is selected and supplied to the image data signal line using the selection signal MUXB. For example, the data signal VDATA is kept at the voltage VDM during periods in which no data is selected using the select signal MUXG.

Next, referring to FIG. 6 and FIG. 7, a driving method of the pixel 180 (the pixel circuit 181) in the light emission period PEM of the previous frame of the current frame (K−1st FRAME) will be described. The light emission period PEM of the previous frame of the current frame (K−1st FRAME) is a period in which the pixel 180 (pixel circuit 181) emits light in accordance with the voltage RDATA (n−1).

The gate electrode 622 of the second transistor T2 is supplied with the voltage RDATA (n−1). The scanning signal G (n) and the scanning signal G (n+1) are supplied with a low level (LO), and the first transistor T1 and the third transistor T3 are in an off-state. Further, the fourth transistor T4 is supplied with a high level (HI) from the light emission control signal EM (n+1), the fifth transistor T5 and the sixth transistor T6 are supplied with a high level (HI) from the light emission control signal EM (n), the fourth transistor T4 and the fifth transistor T5 are in an on-state, and the sixth transistor T6 is in an off-state.

The second transistor T2 is in an on-state based on the voltage RDATA (n−1). Consequently, the second transistor T2 can conduct a current IEL based on a gate/source voltage Vgs and a source/drain voltage Vds according to the voltage RDATA (n−1).

The fourth transistor T4, the second transistor T2, and the fifth transistor T5 are in an on-state, and the current IEL flows from the driving power supply line PVDD to the reference voltage line PVSS. Consequently, the current IEL flows to the light emitting element OLED, and the light emitting element OLED emits light.

Figure 8:
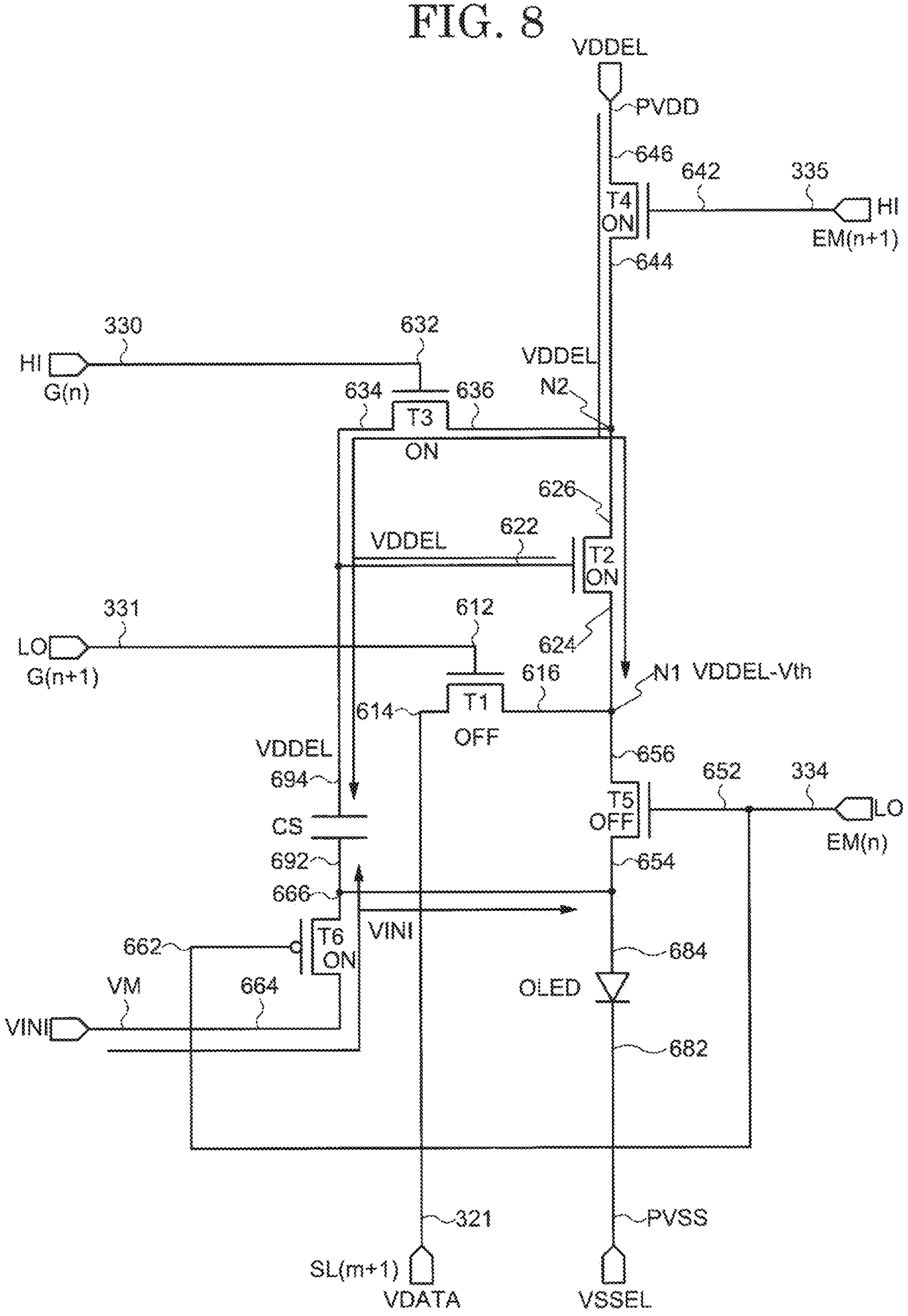
FIG. 8 is a schematic diagram showing an operation-state of the pixel at the timing shown in FIG. 6.

Next, referring to FIG. 6 and FIG. 8, a driving method of the pixel 180 (pixel circuit 181) in the reset period PRS of the current frame will be described. The reset period PRS is a period in which the drive voltage VDDEL and the initialization voltage VINI corresponding to the reset voltage are supplied to the pixel 180 (the pixel circuit 181), and the pixel 180 (the pixel circuit 181) is reset. The reset period PRS of the frame is a period overlapping a part of the one horizontal period N−1st HP and a part of the one horizontal period Nth HP.

The scanning signal G (n) is supplied from a low level (LO) to a high level (HI), and the third transistor T3 is in an on-state in the reset period PRS. The light emission control signal EM (n) is supplied from a high level (HI) to a low level (LO), the fifth transistor T5 is in an off-state, and the sixth transistor T6 is in an on-state. Also, the fourth transistor T4 remains in an on-state and the first transistor T1 remains in an off-state.

The driving voltage VDDEL is supplied to the first node N1, the second node N2, each electrode electrically connected to the first node N1, each electrode electrically connected to the second node N2, the gate electrode 622 of the second transistor T2, and the second electrode 694 of the capacitor CS, based on the fifth transistor T5 and the third transistor T3 being in an on-state. In addition, the initialization voltage VINI is supplied to the first electrode 692 of the capacitor CS, the electrodes electrically connected to the first electrode 692, and the second electrode 684 of the light emitting element OLED based on the sixth transistor T6 being in an on-state. Consequently, the first node N1, the second node N2, each electrode electrically connected to the first node N1, each electrode electrically connected to the second node N2, the gate electrode 622 of the second transistor T2, and the second electrode 694 of the capacitor CS are reset, and the first electrode 692 of the capacitor CS, each electrode electrically connected to the first electrode 692, and the second electrode 684 of the light emitting element OLED are initialized. Further, since the fourth transistor T4 is in an off-state, the current does not flow from the driving power supply line PVDD toward the reference voltage line PVSS, and the current flows from the initialization voltage line VM toward the reference voltage line PVSS. The current flowing through the light emitting element OLED is generally a current based on a potential difference between the initialization voltage VINI and the reference voltage line PVSS. The potential difference between the initialization voltage VINI and the reference voltage line PVSS is small, and the light emitting element OLED does not emit light substantially.

Although a detailed illustration is omitted, the second transistor T2 is in an off-state if a potential difference between the gate electrode 622 of the second transistor T2 and the first electrode 624 (a potential difference between the gate electrode 622 and the first node N1) becomes the same as the threshold voltage Vth of the second transistor T2. Consequently, a difference between the drive voltage VDDEL and the threshold voltage Vth (VDDEL−Vth) is held by the first node N1 and each electrode electrically connected to the first node N1, and the drive voltage VDDEL is held by the second node N2, each electrode electrically connected to the second node N2, the gate electrode 622 of the second transistor T2, and the second electrode 694 of the capacitor CS.

Figure 9:
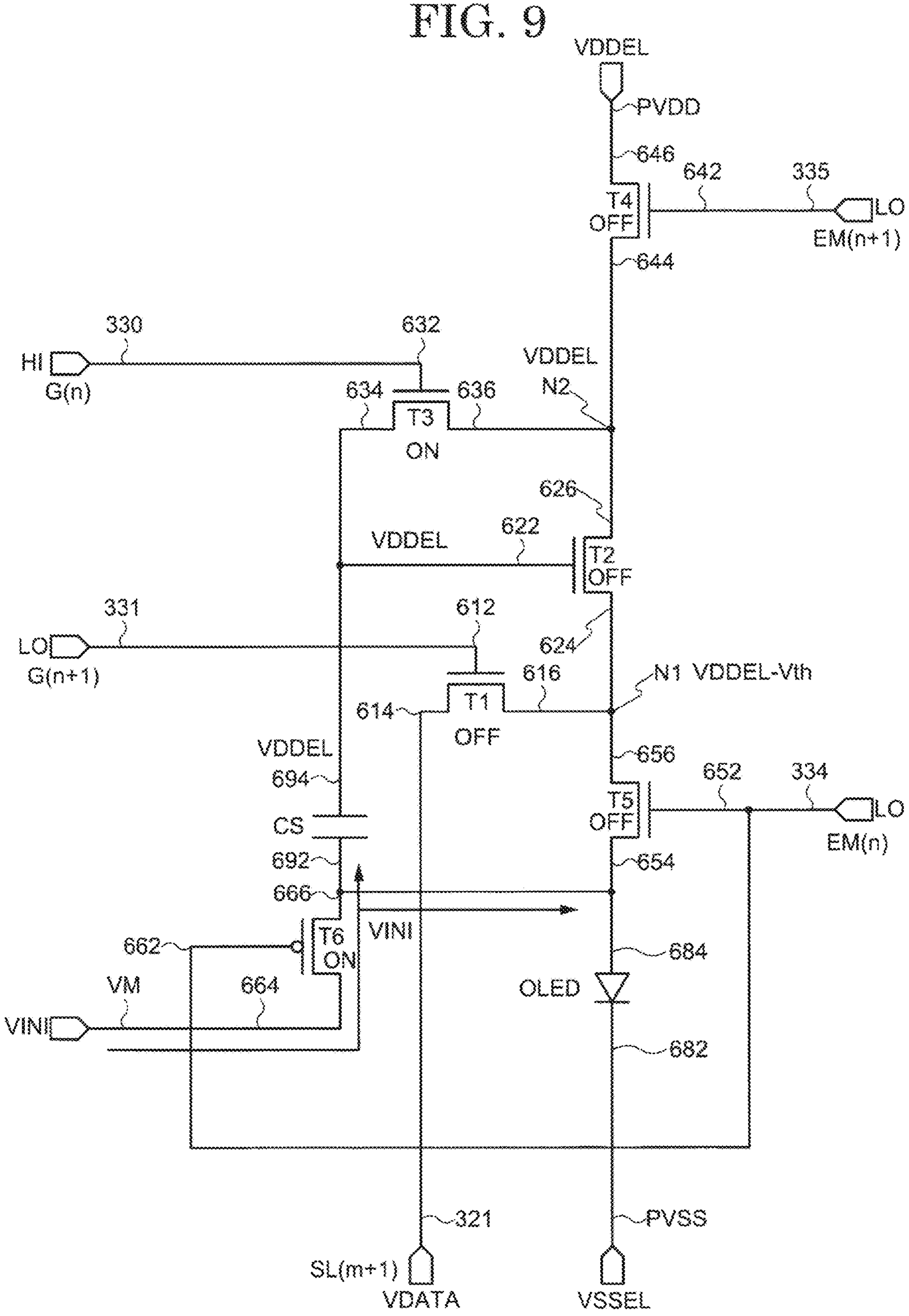
FIG. 9 is a schematic diagram showing an operation-state of the pixel at the timing shown in FIG. 6.

Next, referring to FIG. 6 and FIG. 9, a driving method of the pixel 180 (pixel circuit 181) in the period between the reset period PRS and the sampling period PWR of the current frame will be described. The period between the reset period PRS and the sampling period PWR of the frame is a period overlapping a part of the one horizontal period Nth HP.

The light emission control signal EM (n+1) is supplied from a high level (HI) to a low level (LO), and the fourth transistor T4 is in an off-state, in a period between the reset period PRS and the sampling period PWR of the current frame. In addition, the third transistor T3 and the sixth transistor T6 remain in an on-state, and the first transistor T1 and the fifth transistor T5 remain in an off-state. In addition, the second transistor T2 is in an off-state because the potential difference between the gate electrode 622 of the second transistor T2 and the first electrode 624 (the potential difference between the gate electrode 622 and the first node N1) is the same as the threshold voltage Vth of the second transistor T2.

Further, for example, in the period between the reset period PRS and the sampling period PWR of the current frame, the difference (VDDEL−Vth) between the drive voltage VDDEL and the threshold voltage Vth corresponding to the reset voltage is held in the first node N1 and each electrode electrically connected to the first node N1, and the drive voltage VDDEL corresponding to the reset voltage is held in the second node N2, each electrode electrically connected to the second node N2, the gate electrode 622 of the second transistor T2, and the second electrode 694 of the capacitor CS. In the period between the reset period PRS and the sampling period PWR of the current frame, since the sixth transistor T6 remains in an on-state, the initialization voltage VINI is supplied to the first electrode 692 of the capacitor CS, the respective electrodes electrically connected to the first electrode 692, and the second electrode 684 of the light emitting element OLED. Further, since the second transistor T2, the fourth transistor T4, and the fifth transistor T5 are in an off-state, no current flows from the driving power supply line PVDD to the reference voltage line PVSS. Similar to the reset period PRS, the current flows from the initialization voltage line VM toward the reference voltage line PVSS, and the light emitting element OLED does not substantially emit light.

The voltage RDATA (n) is selected based on the on-signal being supplied to the selection signal MUXR, in the period between the reset period PRS and the sampling period PWR of the current frame. Therefore, the image data signal SL (m+1) includes the voltage RDATA (n). Further, the image data signal SL (m+1) including the voltage RDATA (n) is supplied to the image data signal line 321. The image data signal line 321 holds the voltage RDATA (n) on the basis of an off-signal being supplied to the selection signal MUXR.

Figure 10:
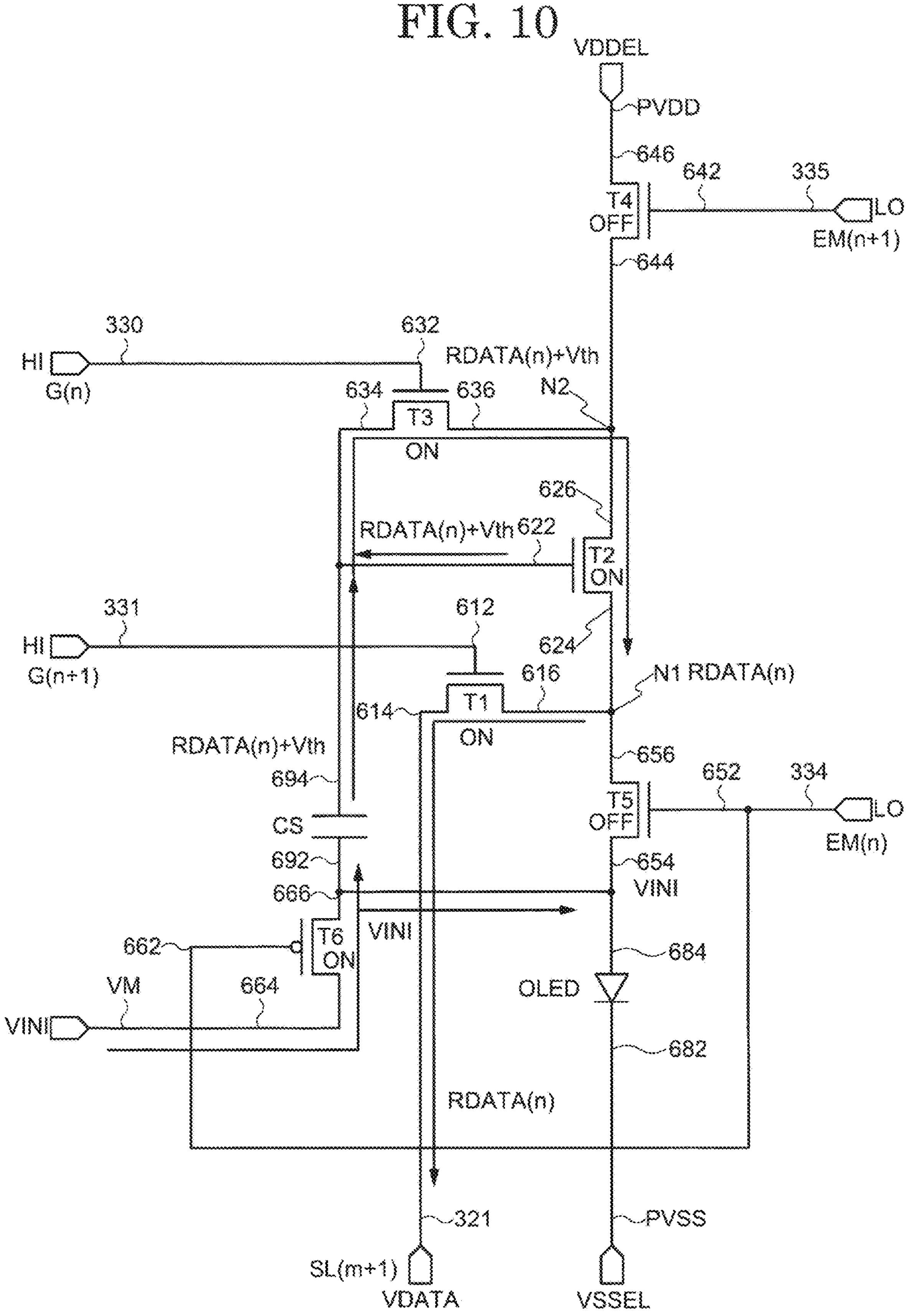
FIG. 10 is a schematic diagram showing an operation-state of the pixel at the timing shown in FIG. 6.

Next, referring to FIG. 6 and FIG. 10, a driving method of the pixel 180 (pixel circuit 181) in the sampling period PWR of the current frame will be described. The sampling period PWR is a period in which a voltage corresponding to image data to be displayed by the pixel 180 (the pixel circuit 181) is written to the pixel 180 (the pixel circuit 181). The sampling period PWR of the current frame is a period overlapping a part of the one-horizontal period Nth HP.

The scanning signal G (n+1) is supplied from a low level (LO) to a high level (HI), and the first transistor T1 is in an on-state, in the sampling period PWR of the current frame. In addition, the third transistor T3 and the sixth transistor T6 remain in an on-state, and the fourth transistor T4 and the fifth transistor T5 remain in an off-state.

Based on the first transistor T1 being in an on-state, the voltage RDATA (n) is supplied to the first node N1 and the respective electrodes electrically connected to the first node N1. Further, if the voltage RDATA (n) is supplied to the first node N1, the voltage (VDDEL−Vth) held in the first node N1 gradually becomes the voltage RDATA (n). In addition, as the voltage of the first node N1 changes, the voltage between the gate/source of the second transistor T2 also changes, and the second transistor T2 is in an on-state. Consequently, the voltage RDATA (n) is supplied to the second node N2, the respective electrodes electrically connected to the second node N2, the gate electrode 622 of the second transistor T2, and the second electrode 694 of the capacitor CS. In addition, since the sixth transistor T6 remains in an on-state, the initialization voltage VINI is supplied to the first electrode 692 of the capacitor CS, the respective electrodes electrically connected to the first electrode 692, and the second electrode 684 of the light emitting element OLED. Further, since the fourth transistor T4 and the fifth transistor T5 remain in an off-state, no current flows from the driving power supply line PVDD to the reference voltage line PVSS. Similar to the reset period PRS, the current flows from the initialization voltage line VM toward the reference voltage line PVSS, and the light emitting element OLED does not substantially emit light.

Although a detailed illustration is omitted, the second transistor T2 is in an off-state if the potential difference between the gate electrode 622 of the second transistor T2 and the first electrode 624 (the potential difference between the gate electrode 622 and the first node N1) becomes the same as the threshold voltage Vth of the second transistor T2. For example, the voltage RDATA (n) is supplied to the first node N1 and each electrode electrically connected to the first node N1. For example, the second transistor T2 is in an off-state if the voltage written to the second node N2 (the respective electrodes electrically connected to the second node N2, the gate electrode 622 of the second transistor T2, and the second electrode 694 of the capacitor CS) becomes the voltage RDATA (n)+the threshold voltage Vth (RDATA (n)+Vth). At this time, the second node N2, the electrodes electrically connected to the second node N2, the gate electrode 622 of the second transistor T2, and the second electrode 694 of the capacitor CS hold the voltage RDATA (n)+the threshold voltage Vth (RDATA (n)+Vth), and the first node N1 and the electrodes electrically connected to the first node N1 hold the voltage RDATA (n). Further, as described above, the first electrode 692 of the capacitor CS, the electrodes electrically connected to the first electrode 692, and the second electrode 684 of the light emitting element OLED are supplied with the initialization voltage VINI and hold the initialization voltage VINI. Therefore, a difference between the voltage held in the second electrode 694 of the capacitor CS and the voltage held in the first electrode 692 of the capacitor CS (a potential difference between the electrodes of the capacitor CS) becomes the voltage VDDEL+the threshold voltage Vth+the initialization voltage VINI (VDDEL+Vth+VINI). In this case, the capacitor CS holds data (information) of the threshold voltage Vth of the second transistor T2. As described above, the sampling period PWR of the current frame is a period in which the voltage corresponding to the image data displayed by the pixel 180 (the pixel circuit 181) is written to the pixel 180 (the pixel circuit 181), and is also a period (threshold correction period) in which the charge corresponding to the threshold voltage Vth of the second transistor T2 is held and the threshold value of the second transistor T2 is corrected.

Figure 11:
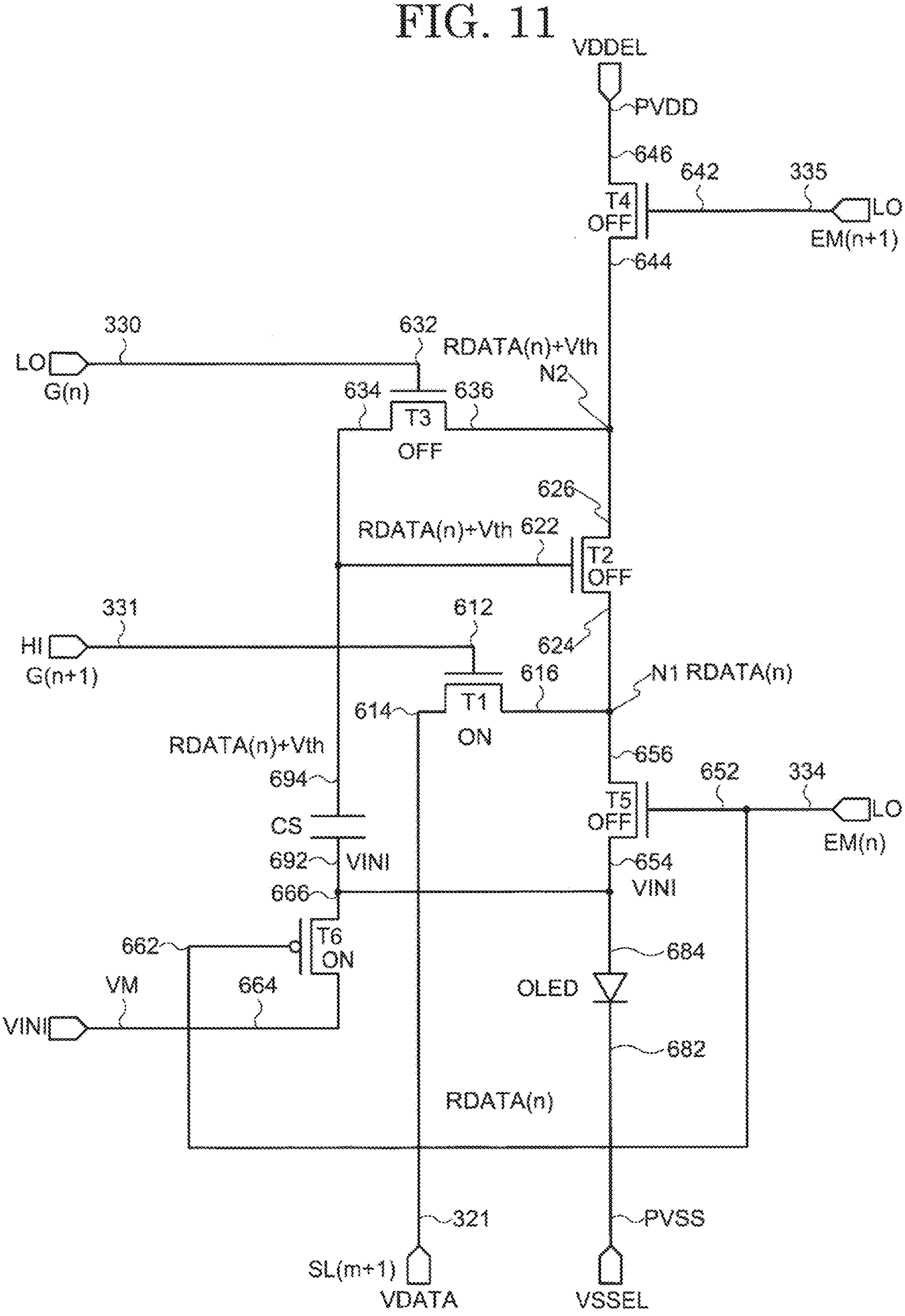
FIG. 11 is a schematic diagram showing an operation-state of the pixel at the timing shown in FIG. 6.

Next, referring to FIG. 6 and FIG. 11, a driving method of the pixel 180 (pixel circuit 181) after the sampling period PWR of the current frame will be described. A period after the sampling period PWR of the current frame is a period overlapping a part of the one horizontal period Nth HP and the one horizontal period N+2nd HP.

The scanning signal G (n) is supplied from a high level (HI) to a low level (LO), and the third transistor T3 is in an off-state, in a period after the sampling period PWR of the current frame. In addition, the first transistor T1 and the sixth transistor T6 remain in an on-state, and the second transistor T2, the fourth transistor T4, and the fifth transistor T5 remain in an off-state.

At this time, the second node N2, each electrode electrically connected to the second node N2, the gate electrode 622 of the second transistor T2, and the second electrode 694 of the capacitor CS hold the voltage RDATA (n)+the threshold voltage Vth (RDATA (n)+Vth), and the first node N1 and each electrode electrically connected to the first node N1 holds the voltage RDATA (n), and each electrode electrically connected to the first electrode 692 of the capacitor CS, each electrode electrically connected to the first electrode 692, and the second electrode 684 of the light emitting element OLED hold the initialization voltage VINI.

At this time, a high level (HI) is supplied to the scanning signal G (n+1), the first transistor T1 is in an on-state, the voltage RDATA (n) is supplied to the first electrode 614 and the second electrode 616 of the first transistor T1, and the first electrode 614 has the same potential as the second electrode 616. That is, since the source electrode and the drain electrode of the first transistor T1 have the same potential, no current flows through the first transistor T1. Further, since the second transistor T2, the fourth transistor T4, and the fifth transistor T5 are in an off-state, no current flows from the driving power supply line PVDD to the reference voltage line PVSS. Similar to the reset period PRS and the sampling period PWR, the current flows from the initialization voltage line VM toward the reference voltage line PVSS, and the light emitting element OLED does not substantially emit light.

Next, as shown in FIG. 6, the scanning signal G (n), the light emission control signal EM (n), and the light emission control signal EM (n+1) are supplied with a low level (LO), and the scanning signal G (n+1) is supplied with a high level (HI) to a low level (LO). Thus, the second transistor T2 to the fifth transistor T5 remain in an off-state, the sixth transistor T6 remains in an on-state, and the first transistor T1 changes from an on-state to an off-state. Each electrode, node, and the like generally hold a voltage (and potential or charge) as described with reference to FIG. 11. In addition, the light emitting element OLED does not substantially emit light.

Next, as shown in FIG. 6, the scanning signal G (n), the scanning signal G (n+1), and the light emission control signal EM (n+1) are supplied with a low level (LO), and the light emission control signal EM (n) is supplied with a low level (LO) to a high level (HI). Therefore, the first transistor T1, the third transistor T3, and the fourth transistor T4 remain in an off-state, the fifth transistor T5 is changed from an off-state to an on-state, and the sixth transistor T6 is changed from an on-state to an off-state. The second transistor T2 may be in either an on-state or an off-state based on a relationship between the voltages of the gate electrode 622, the first electrode 624, and the second electrode 626. Specifically, the voltage of the second electrode 656 and the voltage of the first electrode 654 of the fifth transistor T5 are the voltages RDATA (n) and the initialization voltage VINI (VINI), and the fifth transistor T5 becomes an on-state based on a low level (LO) to a high level (HI) being supplied to the light emission control signal EM (n). Then, redistribution of the electric charges occurs, and the voltage of the second electrode 656 and the voltage of the first electrode 654 become the initialization voltage VINI (VINI). In this case, the gate electrode 622 of the second transistor T2 and the second electrode 694 of the capacitor CS become the voltage RDATA (n)+the threshold voltage Vth−the initialization voltage VINI (RDATA (n)+Vth-VINI). Depending on a value of the voltage RDATA (n), the second transistor T2 may be in an on-state or an off-state.

For example, if the second transistor T2 is in an on-state, current flows from the second node N2 toward the first electrode 692 of the capacitive element CS, the respective electrodes electrically connected to the first electrode 692, and the second electrode 684 of the light emitting element OLED. Consequently, the voltages of the first electrode 692 of the capacitive element CS, the electrodes electrically connected to the first electrode 692, and the second electrode 684 of the light emitting element OLED increase. In addition, a current based on a potential difference between the second electrode 684 of the light emitting element OLED and the first electrode 682 flows to the light emitting element OLED, and the light emitting element OLED emits light. In addition, the potential difference between the second electrode 684 and the first electrode 682 of the light emitting element OLED may be low enough that the light emitting element OLED does not substantially emit light.

Next, referring to FIG. 6 and FIG. 12, methods of driving the pixel 180 (pixel circuit 181) in the light emission period PEM of the current frame will be described. The light emission period PEM of the current frame is a period in which the pixel 180 (the pixel circuit 181) emits light in accordance with the voltage RDATA (n). The emission period PEM of the current frame is a period overlapping the one-horizontal period N+4th HP.

As shown in FIG. 6 and FIG. 12, the scanning signal G (n) and the scanning signal G (n+1) are supplied with a low level (LO), and the light emission control signal EM (n) and the light emission control signal EM (n+1) are supplied with a high level (HI). The first transistor T1, the third transistor T3, and the sixth transistor T6 are in an off-state. The second transistor T2, the fourth transistor T4, and the fifth transistor T5 are in an on-state. Current flows from the driving power supply line PVDD toward the reference voltage line PVSS, based on the fourth transistor T4, the second transistor T2, and the fifth transistor T5 being in an on-state. For example, the current is a current based on the voltage RDATA (n) written in the second transistor T2+the threshold voltage Vth+the voltage β (RDARA (n)+Vth+β), and the current is a current IELA. The current IELA flows to the light emitting element OLED, and the light emitting element OLED emits light. In addition, the voltage β is a positive value, and is a voltage value that changes in accordance with the voltage RDATA (n). For example, if the voltage RDATA(n) increases, the voltage β increases, and if the voltage RDATA (n) decreases, the voltage β decreases. For example, the voltage β is determined such that the current value that the second transistor T2 flows in accordance with the gate electrode 622, the first electrode 624, and the second electrode 626 is the same as a current value that the light emitting element OLED flows.

The self-luminous display device 10 is driven as described above, and image data (for example, voltage RDATA (n)+threshold voltage Vth+voltage β (RDARA (n)+Vth+β) corresponding to each pixel 180 (pixel circuit 181) is supplied to each pixel 180 (pixel circuit 181), a current (for example, the current IELA) corresponding to the image data is supplied to the light emitting element OLED included in each pixel 180 (pixel circuit 181), and each light emitting element OLED emits light with a brightness corresponding to the image data. As a result, the self-luminous display device 10 can display a desired image.

For example, in the conventional driving methods of the self-luminous display device different from the present invention, four circuits corresponding to the first transistor T1 and the sixth transistor T6, the third transistor T3, the fourth transistor T4, and a control circuit (for example, the gate driver and the light emission control circuit) for driving the fifth transistor T5 are required. Therefore, in the self-luminous display device which does not use a shift pulse similar to that of the present invention, the frame region becomes wider (larger).

On the other hand, in the self-luminous display device 10 of the present invention, the gate driver circuit 120 and the light emission control circuit 130 are one system, and the self-luminous display device 10 can drive the transistors included in the pixel 180 (the pixel circuit 181) using the shift pulse. By using the self-luminous display device 10, the number of control circuits for driving the transistors included in the pixel 180 (the pixel circuit 181) can be reduced. By using the self-luminous display device 10, a display device having a narrow frame region can be provided. Further, by using the self-luminous display device 10, since signals to be supplied to the gate electrode of the fourth transistor T4 and the gate electrode of the sixth transistor T6 can be shared, it is possible to simplify a wiring structure such as wiring routing connecting the transistors from a configuration of the conventional self-luminous display device which differs from the present invention. As a result, parasitic capacitances and resistances associated with the wiring routing can be reduced. Therefore, power associated with charging of the parasitic capacitance and the resistor can be reduced. Therefore, by using the self-luminous display device 10, it is possible to suppress power consumption of the display device more than the configuration of the conventional self-luminous display device different from the present invention.

Next, referring to FIG. 13 and FIG. 14, an example of driving methods in which the pixel 180 (pixel circuit 181) displays black based on the initialization voltage VINI supplied from the initialization voltage line VM will be described. As described above, in the low-frequency driving, driving other than the black period PBWR is the same as the high-frequency driving. Thus, mainly driving pixel 180 (pixel circuit 181) in the black period PBWR will now be described. The same or similar configurations as those in FIG. 1 to FIG. 5A and FIG. 6 to FIG. 12 will not be described here. The horizontal axis of the timing charts indicates times (TIME).

The data signal VDATA, the selection signal MUXR, the selection signal MUXG, and the selection signal MUXB are the same as the description with reference to FIG. 6 of the first embodiment, and thus description thereof will be omitted.

Figure 7:
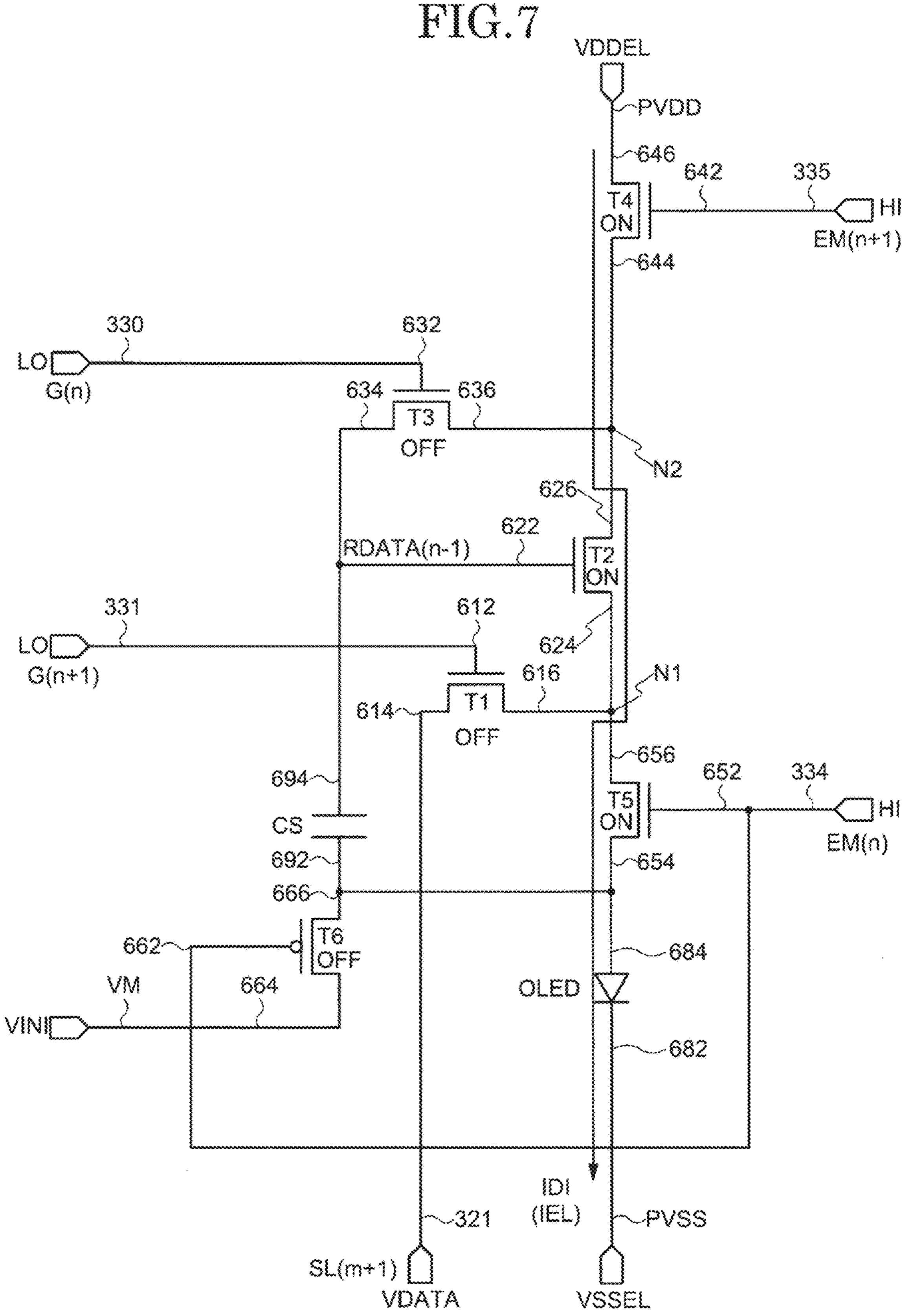
FIG. 7 is a schematic diagram showing an operation-state of a pixel at the timing shown in FIG. 6.

A driving method of the pixel 180 (pixel circuit 181) in the emission period PEM of the previous frame of the current frame (K−1st FRAME) is the same as the driving method described with respect to FIG. 6 and FIG. 7. Therefore, description thereof will be omitted. The voltages of the first node N1, the first electrode 654 of the fifth transistor T5, and the second electrode 684 of the light emitting element OLED in the light emitting period PEM of the previous frame of the current frame (K−1st RAME) are voltages between the voltage VDL and the voltage VDH.

Next, a driving method of the pixel 180 (the pixel circuit 181) in the black period PBWR, which is executed following the emission period PEM of the previous frame of the current frame (K−1st RAME), will be described. The black period PBWR of the current frame is a period overlapping a part of the one horizontal period N−1st HP to a part of the one horizontal period N+3rd HP.

The scanning signal G (n), the scanning signal G (n+1) and the light emission control signal EM (n) are supplied with a low level (LO) in the black period PBWR. The first transistor T1, the second transistor T2, the third transistor T3, and the fifth transistor T5 are in an off-state, and the sixth transistor T6 is in an on-state. The light emission control signal EM (n+1) is supplied with a high level (HI) or a low level (LO). Whether the fourth transistor T4 is in an on-state or an off-state, the second transistor T2 is in an off-state, and the current does not flow from the driving power supply line PVDD toward the reference voltage line PVSS.

Since the sixth transistor T6 is in an on-state, the initialization voltage VINI is supplied from the initialization voltage line VM to the first electrode 692 of the capacitor CS, the respective electrodes electrically connected to the first electrode 692, and the second electrode 684 of the light emitting element OLED. Thus, a current IRB flows from the initialization voltage line VM toward the reference voltage line PVSS. Since the current IRB flowing through the light emitting element OLED is a current for displaying black based on the initialization voltage VINI, the light emitting element OLED does not emit light substantially. Thus, the pixel 180 displays black. A voltage supplied to the initialization voltage line VM (a voltage supplied to the second electrode 684 of the light emitting element OLED) is not limited to the initialization voltage VINI, in the black period PBWR. For example, the voltage supplied to the initialization voltage line VM may be the reference voltage VSSEL, and may be a voltage adjusted according to the electric properties of the transistors in the respective pixels 180. The voltage supplied to the initialization voltage line VM can be appropriately adjusted as long as the light emitting element OLED is a voltage that does not substantially emit light or does not emit light.

A driving method of the pixel 180 (pixel circuit 181) in the light emission period PEM of the current frame (Kth FRAME) is the same as the driving method of the pixel 180 (pixel circuit 181) in the light emission period PEM of the previous frame of the current frame (K−1st FRAME). Therefore, description thereof will be omitted. In addition, voltages of the first node N1 of the light emitting period PEM, the first electrode 654 of the fifth transistor T5, and the second electrode 684 of the light emitting element OLED in the current frame (Kth FRAME) are voltages between the voltage VDL and the voltage VDH.

For example, a luminous transition speed after writing of image data (for example, a sampling period) is the same as a luminous transition speed after the period for displaying black in general, in a period for displaying black in a self-luminous display device. For example, a voltage capable of displaying black on the anode electrode is appropriately set in the period for displaying black. As a result, flicker can be adjusted in the self-luminous display device.

The initialization voltage VINI is supplied from the initialization voltage line VM to the second electrode 684 (anode electrode) of the light emitting element OLED, in the black period PBWR of the self-luminous display device 10 according to the first embodiment, so that the self-luminous display device 10 can display black. As a result, the self-luminous display device 10 can adjust flicker.

Further, since data for displaying black is supplied from the image data signal line to the first node N1 via the first transistor T1 in the conventional self-luminous display device, the image data signal line needs to supply image data corresponding to the image and data for displaying black. The image data corresponding to the image changes according to the luminance of the light emitting element. Therefore, in the conventional self-luminous display device, it is necessary to change an amount of change (for example, an amount of change in voltage) from the image data corresponding to the image to the data for displaying black in accordance with the luminance of the light emitting element. Since the image data signal line is supplied with the image data corresponding to the image and the data for displaying black, depending on the amount of change in the voltage, the change in brightness due to a coupling between the image data signal line and the gate electrode of the second transistor T2 may become a problem.

On the other hand, the initialization voltage VINI, which is a fixed voltage, is supplied from the initialization voltage line VM to the second electrode 684 of the light emitting element OLED in the black period PBWR of the self-luminous display device 10, so that the self-luminous display device 10 can display black. That is, data for displaying black does not need to be supplied from the image data signal line 321 to the first node N1 via the first transistor T1 in the black period PBWR of the self-luminous display device 10. Consequently, there is no change in brightness due to coupling between the image-data-signal line 321 and the gate-electrode 622 of the second transistor T2, in the self-luminous display device 10. Therefore, the self-luminous display device 10 can display an image in which flicker is suppressed more than the conventional self-luminous display device.

In the black period PBWR of the self-luminous display device 10, data for displaying black does not need to be supplied from the image data signal line 321 to the first node N1 via the first transistor T1. Therefore, in the black period PBWR of the self-luminous display device 10, the first transistor T1 and the third transistor T3 can be in an off-state. That is, the gate driver circuit 120 does not need to be driven in the black period PBWR of the self-luminous display device 10. Thus, for example, the control signal supplied to the gate driver circuit 120 is fixed to a low level (LO), the power supply voltage supplied to the gate driver circuit 120 is fixed to 0 V or GND (ground, earth, and the like), and the output (scanning signal G (n), scanning signal G (n+1), and the like) from the gate driver circuit 120 is supplied with a low level (LO). Therefore, by using the driving method of the self-luminous display device 10, the driving method of the display device can be simplified, and the power consumption of the display device can be reduced.

2. Second Embodiment

Figure 15:
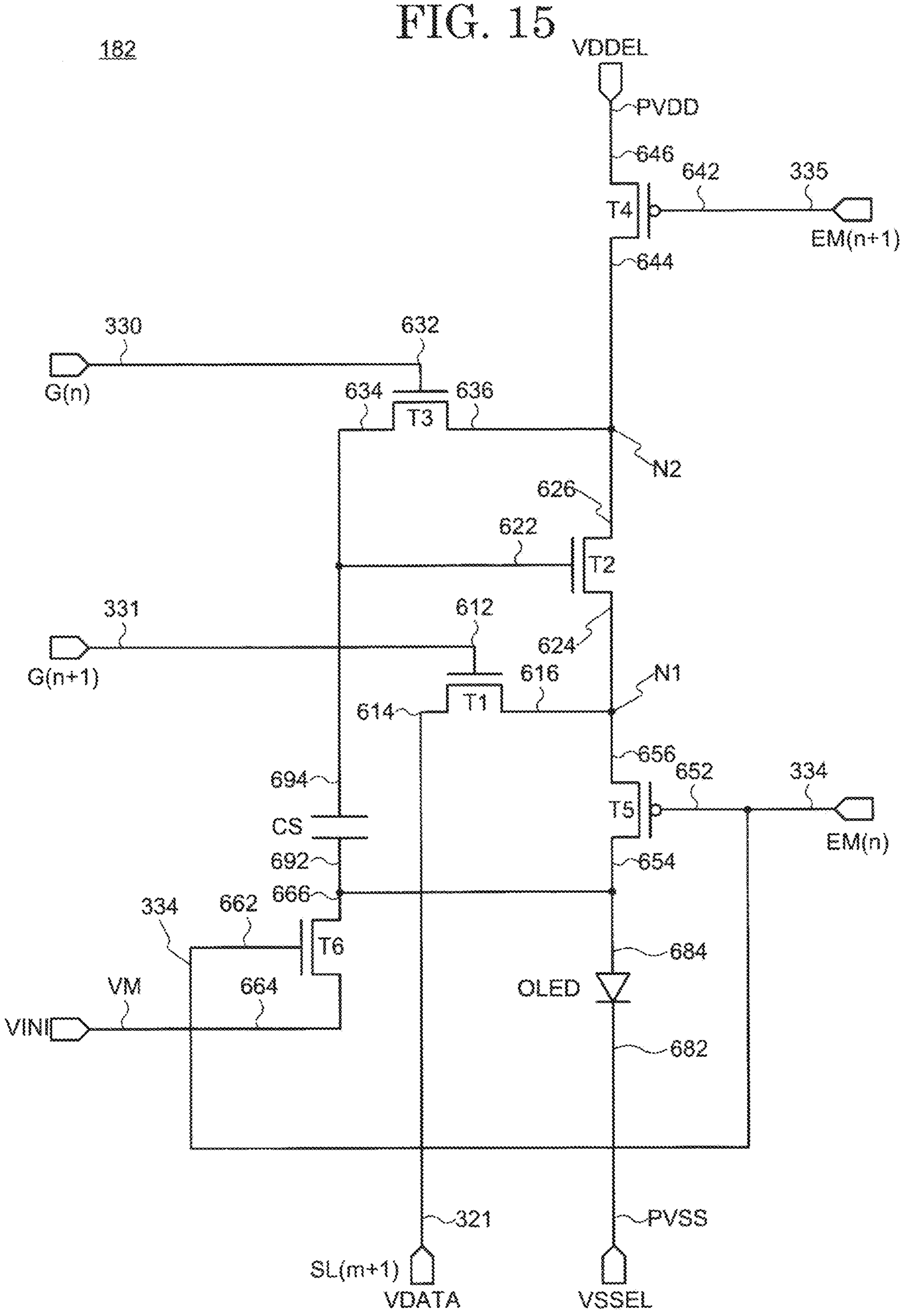
FIG. 15 is a circuit diagram showing a configuration of a pixel circuit according to a second embodiment of the present invention.
Figure 16:
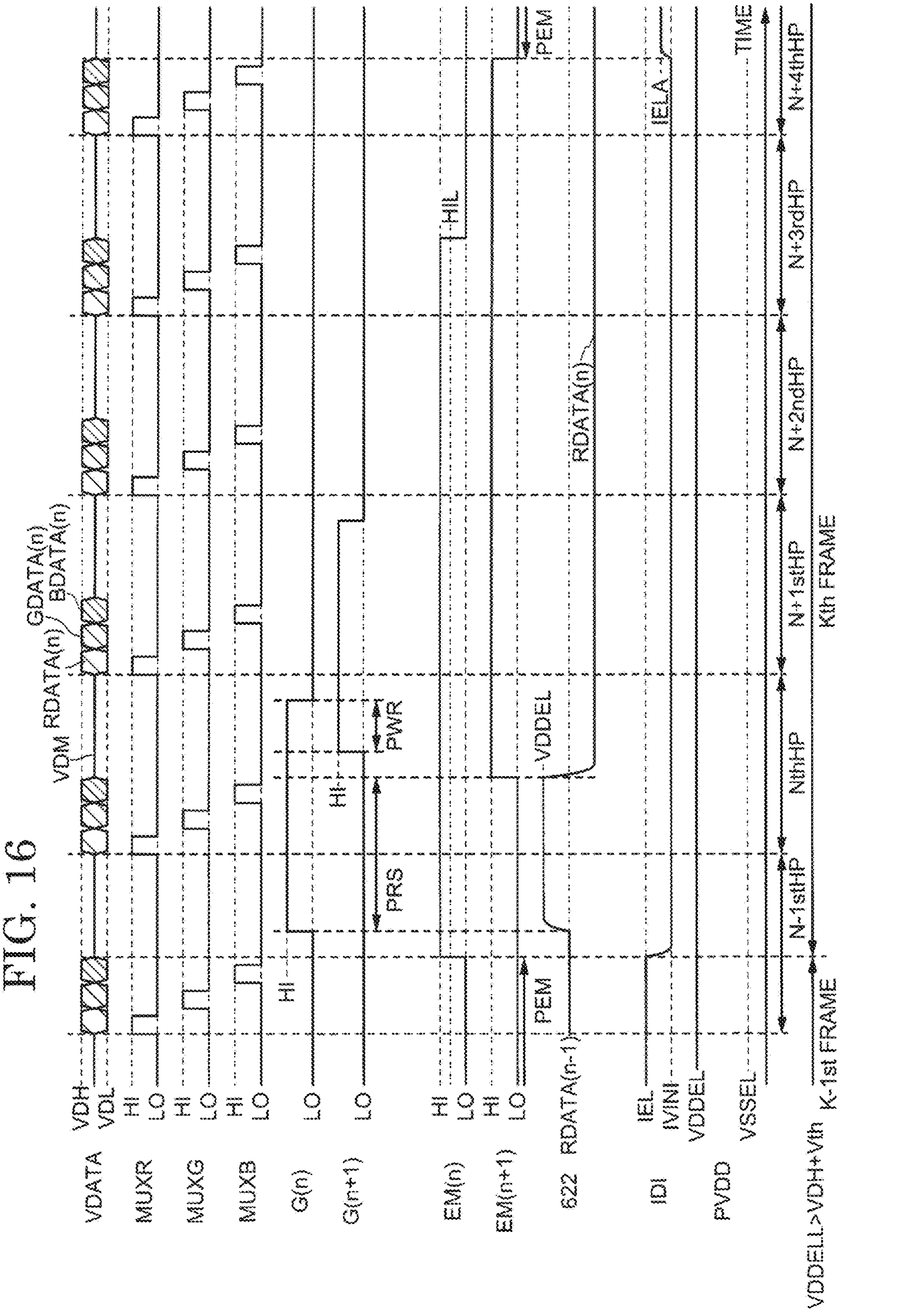
FIG. 16 is a schematic diagram showing a timing chart of a self-luminous display device according to the second embodiment of the present invention.
Figure 17:
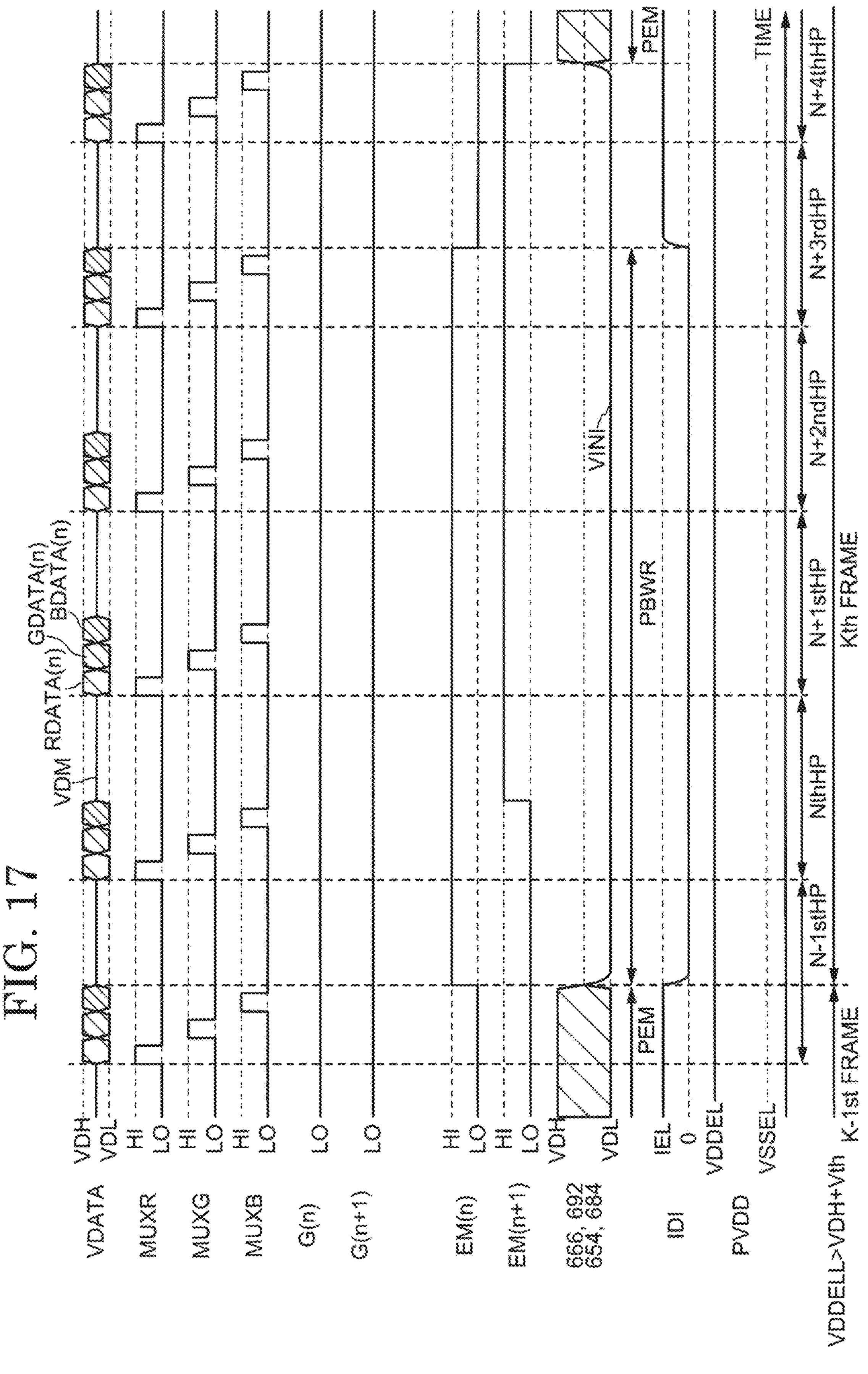
FIG. 17 is a schematic diagram showing a timing chart of the self-luminous display device according to the second embodiment of the present invention.

Referring to FIG. 15 to FIG. 17, a pixel circuit 182 according to a second embodiment will be described. Polarities of the transistors of the fourth transistor T4, the fifth transistor T5 and the sixth transistor T6 in the pixel circuit 182 are opposite to those of the pixel circuit 181. Specifically, in the pixel circuit 181, the fourth transistor T4 and the fifth transistor T5 are n-channel field effect transistors, and the sixth transistor T6 transistor is a p-channel field effect transistor, whereas in the pixel circuit 182, the fourth transistor T4 and the fifth transistor T5 are p-channel field effect transistors, and the sixth transistor T6 is an n-channel field effect transistor. Configurations other than the polarity of the transistor are the same as those of the self-luminous display device 10 and the pixel circuit 181. The pixel circuit 182 shown in FIG. 15 to FIG. 17 is an example, and the pixel circuit 182 is not limited to the example shown in FIG. 15 to FIG. 17. The same or similar configurations as those of the self-luminous display device 10 described in the first embodiment and the same or similar configurations as those of FIG. 1 to FIG. 14 will not be described here.

An overview of the pixel circuit 182 will be described with reference to FIG. 15. FIG. 15 is a circuit diagram showing a configuration of the pixel circuit 182.

The pixel circuit 182 is a circuit for driving the pixel 180 similar to the pixel circuit 181. As described above, the pixel circuit 182 differs from the pixel circuit 181 in that the fourth transistor T4 and the fifth transistor T5 are p-channel field effect transistors, and the transistor of the sixth transistor T6 is n-channel field effect transistor.

Referring to FIG. 15 to FIG. 17, a method of driving the pixel 180 (the pixel circuit 182) will be described. FIG. 16 is a diagram for describing the reset period PRS, the sampling period PWR, and the emission period PEM of the driving methods of the self-luminous display device 10 (the pixel 180 (the pixel circuit 182)). FIG. 17 is a diagram for describing the black period PBWR of driving methods of the self-luminous display device 10 (pixel 180 (pixel circuit 182)).

Since the fourth transistor T4 and the fifth transistor T5 are p-channel field effect transistors and the transistor of the sixth transistor T6 is an n-channel field effect transistor in the pixel circuit 182 according to the second embodiment, the light emission control signal EM (n) and the light emission control signal EM (n+1) are inverted with respect to the pixel 180 (pixel circuit 181) according to the first embodiment.

The driving method of the self-luminous display device according to the second embodiment shown in FIG. 16 and FIG. 17 is a driving method in which a high level (HI) supplied to the light emission control signal EM (n) and the light emission control signal EM (n+1) in the driving method of the self-luminous display device 10 according to the first embodiment shown in FIG. 6 and FIG. 13 is replaced with a low level (LO), and a low level (LO) is replaced with a high level (HI). The driving method other than the light emission control signal EM (n) and the light emission control signal EM (n+1) of the driving method of the self-luminous display device according to the second embodiment is the same as the driving method of the self-luminous display device 10 according to the first embodiment, and thus detailed explanation thereof will be omitted.

Further, the light emission control signal EM (n) may be supplied with a high level (HIL) lower than a high level (HI) in the self-luminous display device according to the second embodiment.

For example, since the fifth transistor T5 is a p-channel field effect transistor in the light emitting period PEM of the current frame (Kth FRAME), a high level (HI) to a low level (LO) is supplied to the light emission control signal EM (n). A high level (HI) to a low level (LO) is supplied to the light emission control signal EM (n) in the pixel circuit 182. Therefore, since a low level (LO) to a high level (HI) are supplied to the light emission control signal EM (n), it is possible to suppress an increase in a voltage of the anode electrode due to the coupling between the light emission control signal line 334 and the second electrode 684 (anode electrode) of the light emitting element OLED. If the voltage of the anode electrode increases, a larger current flows through the light emitting element OLED than the case where the pixel 180 displays black, and thus the pixel 180 is less likely to display black. On the other hand, since the self-luminous display device 10 (pixel 180 (pixel circuit 182)) according to the second embodiment can suppress an increase in the voltage of the anode electrode, it is possible to increase a margin at the time of displaying black.

Since the fourth transistor T4 is a p-channel field effect transistor in the self-luminous display device 10 (the pixel 180 (the pixel circuit 182)) according to the second embodiment, the high voltage of the light emission control signal EM(n) can be reduced from a high level (HI) to a high level (HIL) lower than a high level (HI). As a result, since the voltage supplied to the gate electrode 642 of the fourth transistor T4 can be reduced, the power consumption of the self-luminous display device 10 can be reduced.

3. Third Embodiment

Figure 18:
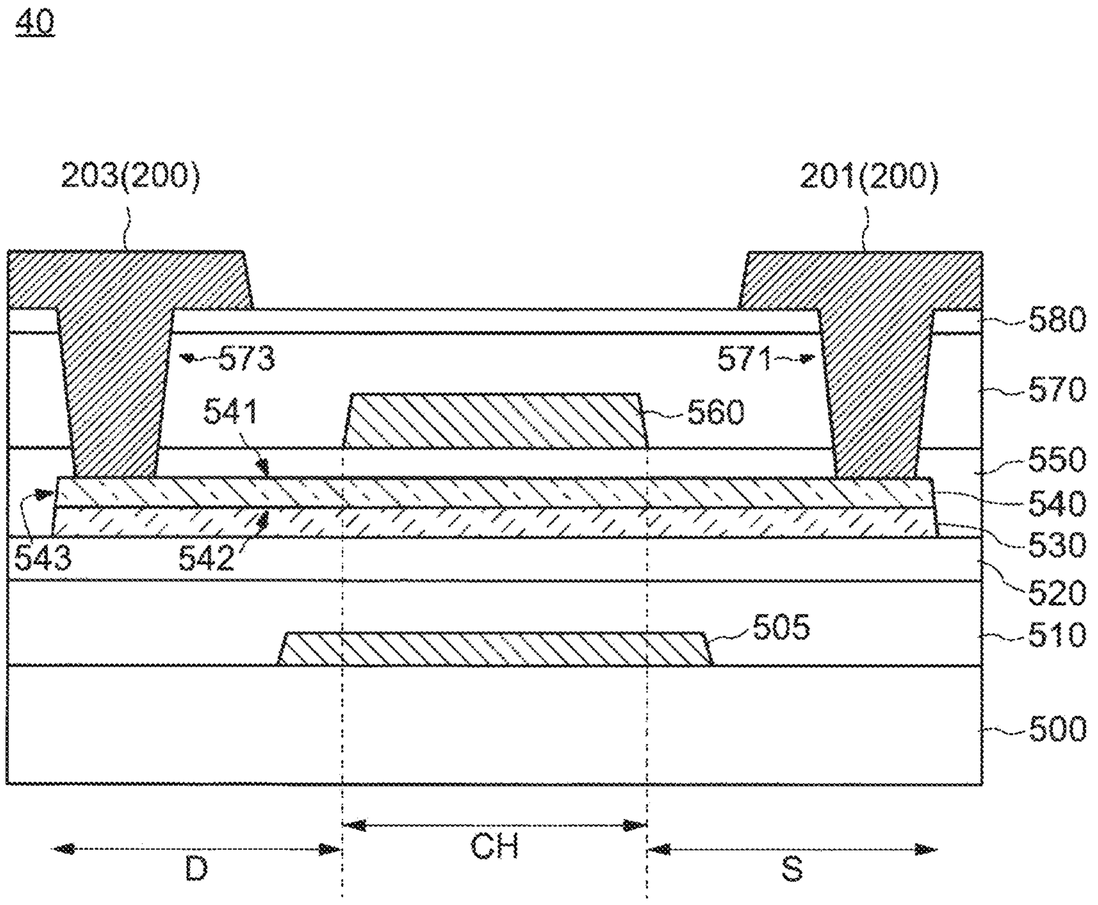
FIG. 18 is a cross-sectional view showing an overview of a semiconductor device according to a third embodiment of the present invention.
Figure 19:
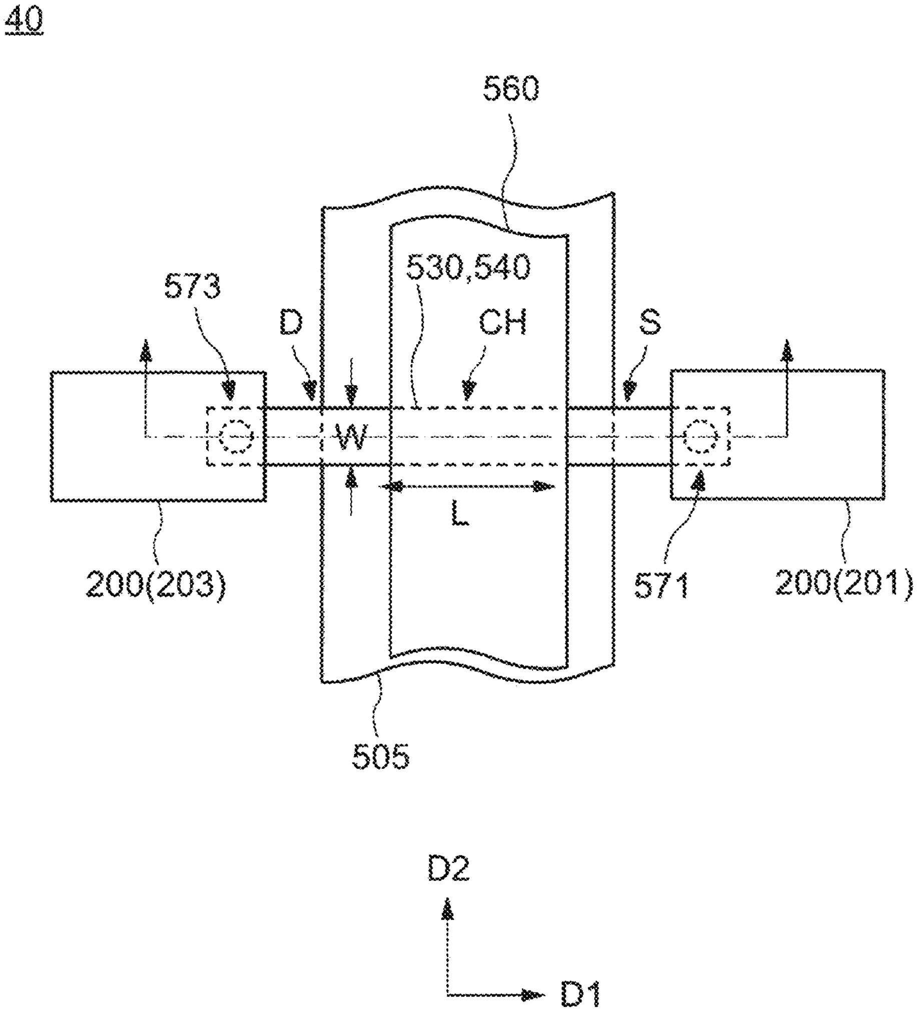
FIG. 19 is a plan view showing the overview of the semiconductor device according to the third embodiment of the present invention.
Figure 20:
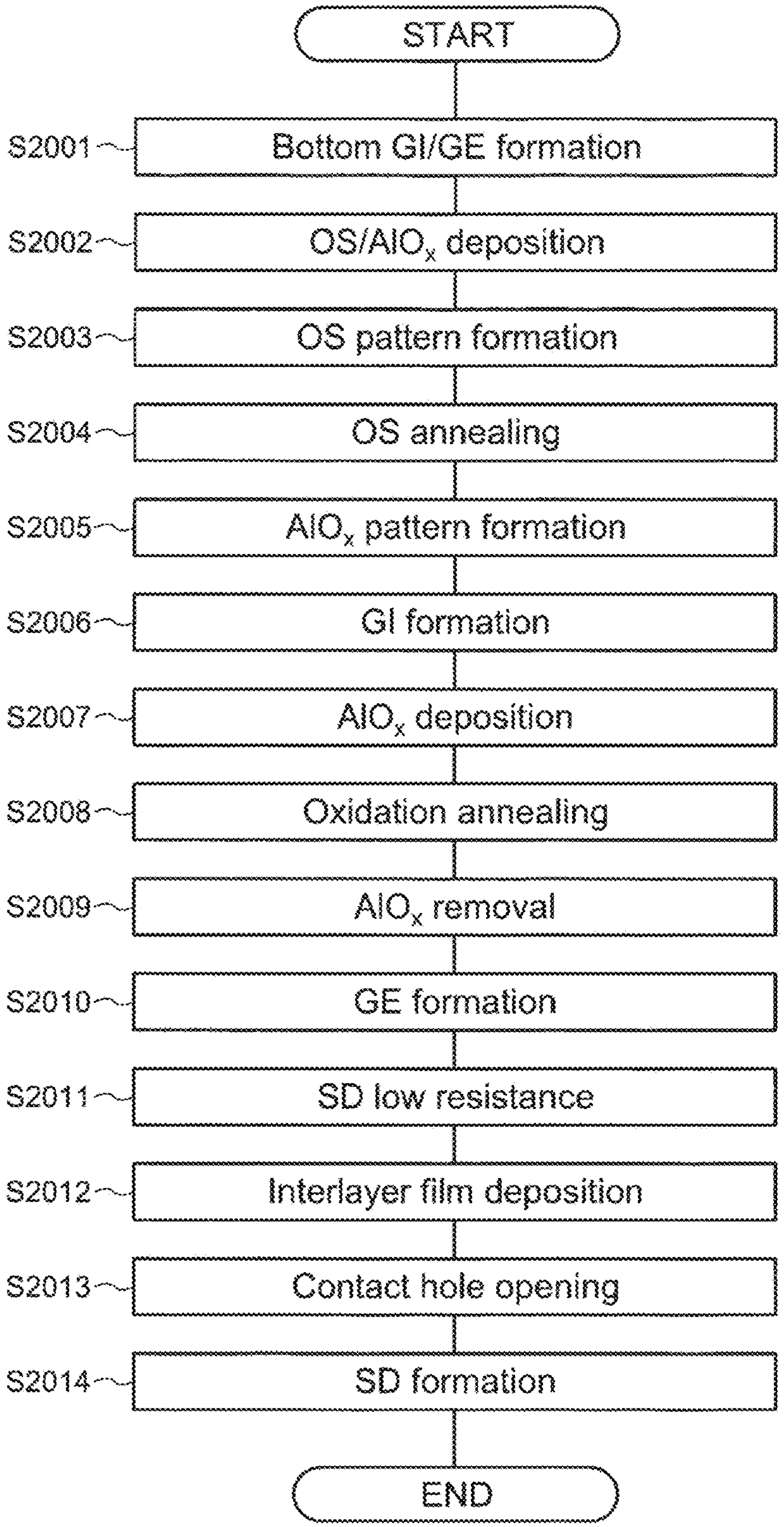
FIG. 20 is a sequence diagram showing a method for manufacturing the semiconductor device according to the third embodiment of the present invention.
Figure 30:
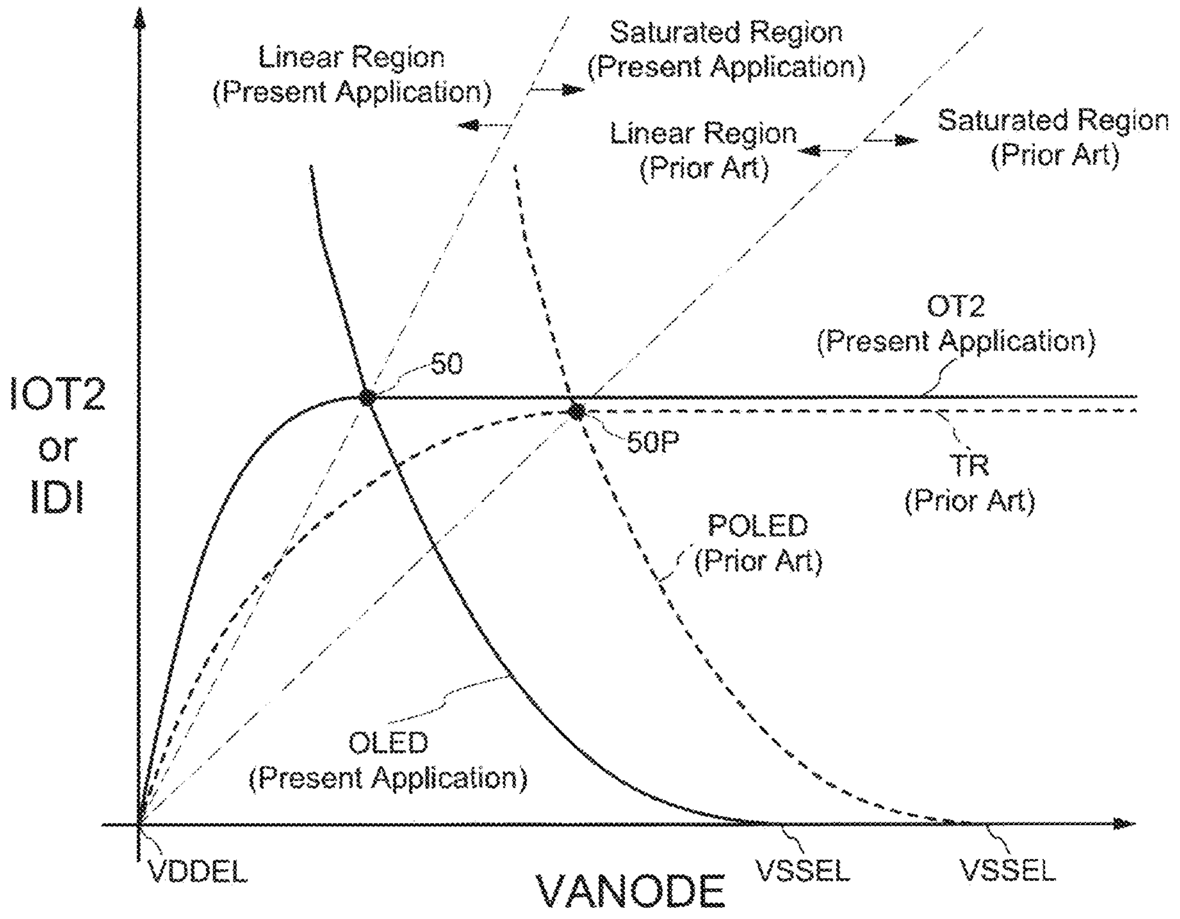
FIG. 30 is a graph showing an example of electrical characteristics of the semiconductor device according to the third embodiment of the present invention and an example of electrical characteristics of a semiconductor device according to a comparative example.
Figure 31:
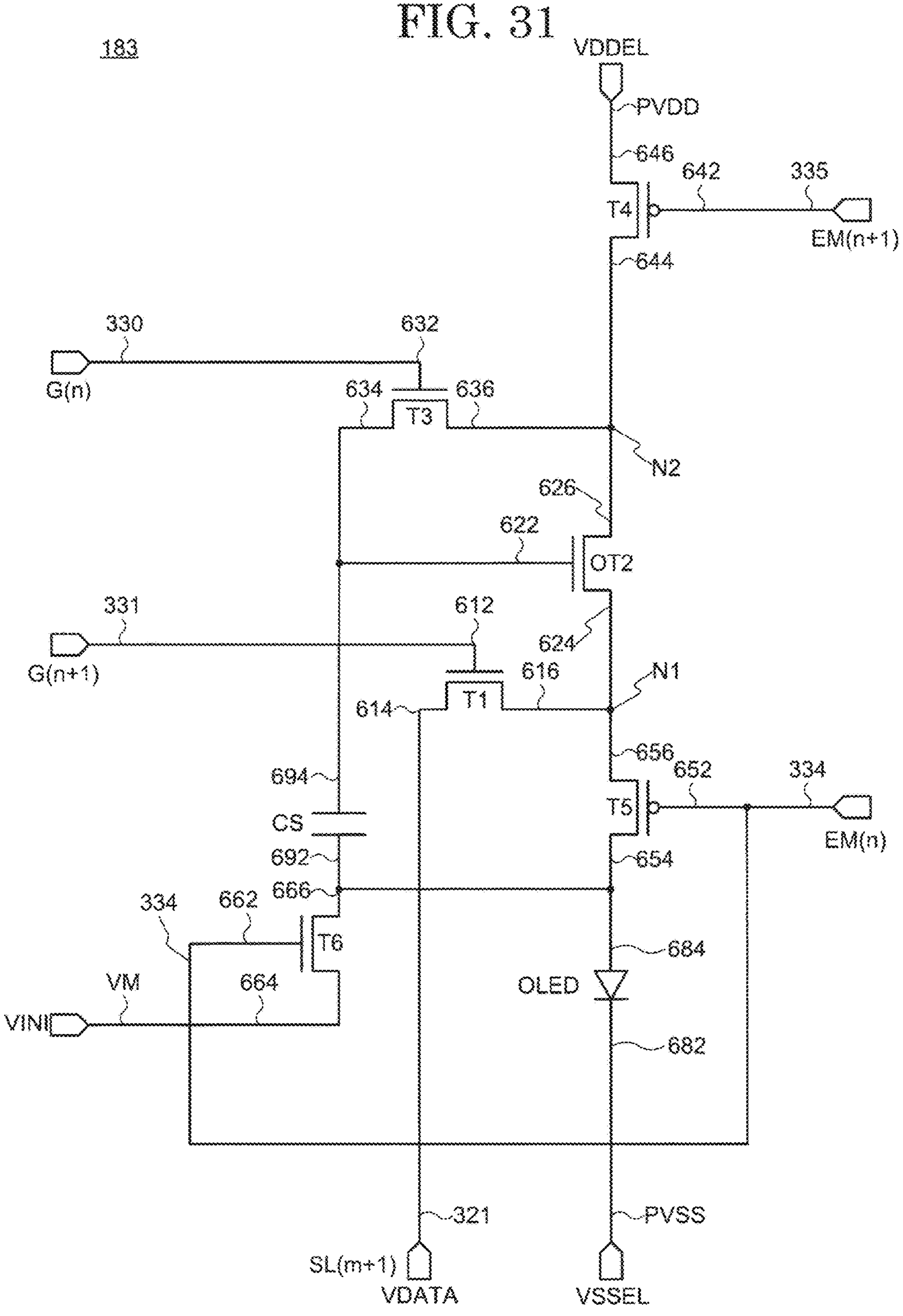
FIG. 31 is a schematic diagram showing the configuration of the pixel circuit according to the third embodiment of the present invention.

Referring to FIG. 18 to FIG. 31, an example of a method of manufacturing a semiconductor device 40, an electrical characteristic, and a pixel circuit used in a self-luminous display device according to a third embodiment will be described. FIG. 18 and FIG. 19 are a cross-sectional view and a plan view showing an overview of the semiconductor device 40 used in the self-luminous display device according to the embodiment of the present invention. FIG. 20 is a sequence diagram showing a method of manufacturing the semiconductor device 40. FIG. 21 to FIG. 29 are cross-sectional views showing a method of manufacturing the semiconductor device 40. FIG. 30 is a graph showing an example of electrical characteristics of the semiconductor device 40 and an example of electrical characteristics of a semiconductor device of a comparative example. FIG. 31 is a schematic diagram showing a configuration of a pixel circuit using the semiconductor device 40. Descriptions of the same or similar configurations as those in FIG. 1 to FIG. 17 will be omitted.

In a description of the third embodiment, a direction from a substrate toward an oxide semiconductor layer is referred to as "upper" or "above", and a direction from the oxide semiconductor layer toward the substrate is referred to as "lower" or "below". In the description of the third embodiment, for example, the substrate and the oxide semiconductor layer may be arranged upside down. An expression "oxide semiconductor layer on the substrate" merely describes the vertical relationship between an arrangement of the substrate and the oxide semiconductor layer, and other members may be arranged between the substrate and the oxide semiconductor layer. The expression "above" or "below" means a stacking order in a structure in which a plurality of layers are stacked. For example, in the case of expressing the pixel electrode above the transistor, a positional relationship between the transistor and the pixel electrode may be such that the positional relationship between the transistor and the pixel electrode does not overlap in plan view. On the other hand, the expression "pixel electrode vertically above the transistor" means a positional relationship in which the positional relationship between the transistor and the pixel electrode overlaps in a plan view.

[3-1. Configuration of Semiconductor Device 40]

As shown in FIG. 18, the semiconductor device 40 is provided above a substrate 500. The semiconductor device 40 includes a gate electrode 505, gate insulating layers 510 and 520, a metal oxide layer 530, an oxide semiconductor layer 540, a gate insulating layer 550, a gate electrode 560, insulating layers 570 and 580, a source electrode 201, and a drain electrode 203. In the case where the source electrode 201 and the drain electrode 203 are not particularly distinguished from each other, they may be collectively referred to as a source/drain electrode 200.

The gate electrode 505 is provided on the substrate 500. The gate insulating layer 510 and the gate insulating layer 520 are provided on the substrate 500 and the gate electrode 505. The metal oxide layer 530 is provided on the gate insulating layer 520. The metal oxide layer 530 is in contact with the gate insulating layer 520. The oxide semiconductor layer 540 is provided on the metal oxide layer 530. The oxide semiconductor layer 540 is in contact with the metal oxide layer 530. A surface of a main surface of the oxide semiconductor layer 540 in contact with the metal oxide layer 530 is referred to as a lower surface 542. An end portion of the metal oxide layer 530 and an end portion of the oxide semiconductor layer 540 substantially coincide with each other.

A semiconductor layer or an oxide semiconductor layer in the third embodiment is not provided between the metal oxide layer 530 and the substrate 500.

The metal oxide layer 530 is in contact with the gate insulating layer 520, and the oxide semiconductor layer 540 is in contact with the metal oxide layer 530, in the third embodiment. However, the configuration according to the third embodiment is not limited to the configuration exemplified here. For example, other layers may be provided between the gate insulating layer 520 and the metal oxide layer 530, and other layers may be provided between the metal oxide layer 530 and the oxide semiconductor layer 540.

In FIG. 18, sidewalls of the metal oxide layer 530 and sidewalls of the oxide semiconductor layer 540 are arranged in a straight line. However, the configuration according to the third embodiment is not limited to the configuration shown in FIG. 18. For example, an angle of the side wall of the metal oxide layer 530 with respect to a main surface of the substrate 500 may be different from an angle of the side wall of the oxide semiconductor layer 540, and a cross-sectional shape of the side wall of at least one of the metal oxide layer 530 and the oxide semiconductor layer 540 may be curved.

The gate electrode 560 faces the oxide semiconductor layer 540. The gate insulating layer 550 is provided between the oxide semiconductor layer 540 and the gate electrode 560. The gate insulating layer 550 is in contact with the oxide semiconductor layer 540. A surface of the main surface of the oxide semiconductor layer 540 in contact with the gate insulating layer 550 is referred to as an upper surface 541. A surface between the upper surface 541 and the lower surface 542 is referred to as a side surface 543. The insulating layers 570 and 580 are provided on the gate insulating layer 550 and the gate electrode 560. Openings 571 and 573 that reach the oxide semiconductor layer 540 are provided in the insulating layers 570 and 580. The source electrode 201 is provided inside the opening 571. The source electrode 201 is in contact with the oxide semiconductor layer 540 at a bottom portion of the opening 571. The drain electrode 203 is provided inside the opening 573. The drain electrode 203 is in contact with the oxide semiconductor layer 540 at a bottom portion of the opening 573.

The gate electrode 505 has a function as a bottom gate of the semiconductor device 40 and a function as a light shielding film for the oxide semiconductor layer 540. The gate insulating layer 510 functions as a barrier film that shields impurities that diffuse from the substrate 500 toward the oxide semiconductor layer 540. The gate insulating layers 510 and 520 each have a function as a gate insulating layer with respect to the bottom gate. The metal oxide layer 530 is a layer containing a metal oxide containing aluminum as a main component, and has a function as a gas barrier film for shielding a gas such as oxygen or hydrogen.

The oxide semiconductor layer 540 is divided into a source region S, a drain region D, and a channel region CH. The channel region CH is a region of the oxide semiconductor layer 540 vertically below the gate electrode 560. The source region S is a region of the oxide semiconductor layer 540 that does not overlap the gate electrode 560 and is closer to the source electrode 201 than the channel region CH. The drain region D is a region of the oxide semiconductor layer 540 that does not overlap the gate electrode 560 and is closer to the drain electrode 203 than the channel region CH. The oxide semiconductor layer 540 in the channel region CH has physical properties as a semiconductor. The oxide semiconductor layer 540 in the source region S and the drain region D has physical properties as a conductor.

The gate electrode 560 functions as a light shielding film for the top gate and the oxide semiconductor layer 540 of the semiconductor device 40. The gate insulating layer 550 has a function as a gate insulating layer with respect to the top gate, and has a function of releasing oxygen by a heat treatment in a manufacturing process. The insulating layers 570 and 580 have a function of insulating the gate electrode 560 and the source/drain electrode 200 and reducing parasitic capacitance therebetween. An operation of the semiconductor device 40 is mainly controlled by a voltage supplied to the gate electrode 560. An auxiliary voltage is supplied to the gate electrode 505. However, in the case where the gate electrode 505 is simply used as a light shielding film, a specific voltage may not be supplied to the gate electrode 505 and may be floating. That is, the gate electrode 505 may be simply referred to as a "light shielding film".

In the third embodiment, although a configuration in which a dual-gate transistor in which a gate electrode is provided both above and below the oxide semiconductor layer is used as the semiconductor device 40 is exemplified, the configuration is not limited to this configuration. For example, as the semiconductor device 40, a bottom-gate transistor in which the gate electrode is provided only below the oxide semiconductor layer, or a top-gate transistor in which the gate electrode is provided only above the oxide semiconductor layer may be used. The above configuration is merely an embodiment, and the present invention is not limited to the above configuration.

As shown in FIG. 19, in a plan view, a planar pattern of the metal oxide layer 530 is substantially the same as a planar pattern of the oxide semiconductor layer 540. Referring to FIG. 18 and FIG. 19, the lower surface 542 of the oxide semiconductor layer 540 is covered with the metal oxide layer 530. In particular, in the third embodiment, all of the lower surface 542 of the oxide semiconductor layer 540 is covered with the metal oxide layer 530. In the direction D1, a width of the gate electrode 505 is larger than a width of the gate electrode 560. The direction D1 is a direction connecting the source electrode 201 and the drain electrode 203, and is a direction indicating a channel length L of the semiconductor device 40. Specifically, a length in the direction D1 of the region where the oxide semiconductor layer 540 and the gate electrode 560 overlap (channel region CH)

is the channel length L, and a width in the direction D2 of the channel region CH is a channel width W.

The third embodiment exemplifies a configuration in which all of the lower surface 542 of the oxide semiconductor layer 540 is covered with the metal oxide layer 530. However, the configuration according to the third embodiment is not limited to the configuration shown here. For example, a part of the lower surface 542 of the oxide semiconductor layer 540 may not be in contact with the metal oxide layer 530. For example, all of the lower surface 542 of the oxide semiconductor layer 540 in the channel region CH may be covered with the metal oxide layer 530, and all or a part of the lower surface 542 of the oxide semiconductor layer 540 in the source region S and the drain region D may not be covered with the metal oxide layer 530. That is, all or a part of the lower surface 542 of the oxide semiconductor layer 540 in the source region S and the drain region D may not be in contact with the metal oxide layer 530. However, in the above configuration, a part of the lower surface 542 of the oxide semiconductor layer 540 in the channel region CH may not be covered with the metal oxide layer 530, and another part of the lower surface 542 may be in contact with the metal oxide layer 530.

In the third embodiment, although the gate insulating layer 550 is formed over the entire surface and the openings 571 and 573 are provided in the gate insulating layer 550, the configuration is not limited to this configuration. The gate insulating layer 550 may be patterned in a shape different from the shapes in which the openings 571 and 573 are provided. For example, the gate insulating layer 550 may be patterned so as to expose all or a part of the oxide semiconductor layer 540 in the source region S and the drain region D. That is, the gate insulating layer 550 in the source region S and the drain region D may be removed, and the oxide semiconductor layer 540 and the insulating layer 570 may be in contact with each other in these regions.

In FIG. 19, although a configuration in which the source/drain electrode 200 does not overlap the gate electrode 505 and the gate electrode 560 in a plan view is shown, the configuration is not limited to this configuration. For example, in a plan view, the source/drain electrode 200 may overlap with at least one of the gate electrode 505 and the gate electrode 560. The above configuration is merely an embodiment, and the present invention is not limited to the above configuration.

[3-2. Material of Each Member of the Semiconductor Device 40]

As the substrate 500, a rigid substrate having translucency, such as a glass substrate, a quartz substrate, and a sapphire substrate, is used. In the case where the substrate 500 needs to have flexibility, a substrate containing a resin such as a polyimide substrate, an acrylic substrate, a siloxane substrate, or a fluororesin substrate is used as the substrate 500. In the case where a substrate containing a resin is used as the substrate 500, impurities may be introduced into the resin in order to improve heat resistance of the substrate 500. In particular, in the case where the semiconductor device 40 is used in a top emission type self-luminous display device, since the substrate 500 does not need to be transparent, impurities that deteriorate transparency of the substrate 500 may be used.

A general metal material is used as the gate electrode 505, the gate electrode 560, and the source/drain electrode 200. For example, aluminum (Al), titanium (Ti), chromium (Cr), cobalt (Co), nickel (Ni), molybdenum (Mo), hafnium (Hf), tantalum (Ta), tungsten (W), bismuth (Bi), silver (Ag), copper (Cu), and alloys or compounds thereof are used as the members. The above materials may be used as the gate electrode 505, the gate electrode 560, and the source/drain electrode 200 in a single layer or in a stacked layer.

A general insulating material is used as the gate insulating layers 510 and 520 and the insulating layers 570 and 580. For example, inorganic insulating layers such as silicon oxide ($SiO_x$), silicon oxynitride ($SiO_xN_y$), silicon nitride ($SiN_x$), silicon nitride oxide ($SiN_xO_y$), aluminum oxide ($AlO_x$), aluminum oxynitride ($AlO_xN_y$), aluminum nitride oxide ($AlN_xO_y$), and aluminum nitride ($AlN_x$) are used as the insulating layers.

As the gate insulating layer 550, an insulating layer containing oxygen among the insulating layers described above is used. For example, an inorganic insulating layer such as silicon oxide ($SiO_x$), silicon oxynitride ($SiO_xN_y$), aluminum oxide ($AlO_x$), or aluminum oxynitride ($AlO_xN_y$) is used as the gate insulating layer 550.

As the gate insulating layer 520, an insulating layer having a function of releasing oxygen by a heat treatment is used. The temperature of the heat treatment in which the gate insulating layer 520 releases oxygen is, for example, 600° C. or less, 500° C. or less, 450° C. or less, or 400° C. or less. That is, the gate insulating layer 520 emits oxygen at a heat treatment temperature performed in the manufacturing process of the semiconductor device 40 in a case where the glass substrate is used as the substrate 500, for example.

As the gate insulating layer 550, an insulating layer with few defects is used. For example, in the case where a composition ratio of oxygen in the gate insulating layer 550 is compared with a composition ratio of oxygen in an insulating layer having the same composition as that of the gate insulating layer 550 (hereinafter referred to as "other insulating layer"), the composition ratio of oxygen in the gate insulating layer 550 is closer to a stoichiometric ratio with respect to the insulating layer than the composition ratio of oxygen in the other insulating layer. Specifically, in the case where silicon oxide ($SiO_x$) is used for each of the gate insulating layer 550 and the insulating layer 580, a composition ratio of oxygen in the silicon oxide used as the gate insulating layer 550 is closer to a stoichiometric ratio of silicon oxide than a composition ratio of oxygen in the silicon oxide used as the insulating layer 580. For example, as the gate insulating layer 550, a layer in which no defects are observed when evaluated by electron spin resonance (ESR) may be used.

$SiO_xN_y$ and $AlO_xN_y$ described above are silicon-containing and aluminum-containing compounds that contain a smaller proportion (x>y) of nitrogen (N) than oxygen (O). $SiN_xO_y$ and $AlN_xO_y$ are silicon-containing and aluminum-containing compounds that contain a lower proportion of oxygen than nitrogen (x>y).

As the metal oxide layer 530 and a metal oxide layer 590 used in the manufacturing process as described later, a metal oxide layer containing aluminum as a main component is used. For example, as the metal oxide layer 530 (or the metal oxide layer 590), an inorganic insulating layer such as aluminum oxide ($AlO_x$), aluminum oxynitride ($AlO_xN_y$), aluminum nitride oxide ($AlN_xO_y$), or aluminum nitride ($AlN_x$) is used. The "metal oxide layer containing aluminum as a main component" means that a ratio of aluminum contained in the metal oxide layer 530 (or the metal oxide layer 590) is 1% or more of the total amount of the metal oxide layer 530 (or the metal oxide layer 590). The ratio of aluminum contained in the metal oxide layer 530 (or the metal oxide layer 590) may be 5% or more and 70% or less, 10% or more and 60% or less, or 30% or more and 50% or less of the entire metal oxide layer 530. The ratio may be a mass ratio or a weight ratio.

As the oxide semiconductor layer 540, a metal oxide having characteristics of a semiconductor can be used. For example, as the oxide semiconductor layer 540, an oxide semiconductor containing two or more metals containing indium (In) is used. A ratio of indium to the entire oxide semiconductor layer 540 is 50% or more. In addition to indium, gallium (Ga), zinc (Zn), aluminum (Al), hafnium (Hf), yttrium (Y), zirconia (Zr), and lanthanoids are used as the oxide semiconductor layer 540. As the oxide semiconductor layer 540, an element other than the elements described above may be used.

The oxide semiconductor layer 540 may be amorphous or crystalline. The oxide semiconductor layer 540 may be a mixed phase of amorphous and crystal. As described below, in the oxide semiconductor layer 540 in which the ratio of indium is 50% or more, oxygen vacancies are likely to be formed. A crystalline oxide semiconductor is less likely to form oxygen vacancies than an amorphous oxide semiconductor. Therefore, the oxide semiconductor layer 540 as described above is preferably crystalline.

[3-3. Problems Newly Recognized in the Process Leading to the Present Invention]

Since the ratio of indium in the oxide semiconductor layer 540 is 50% or more, the semiconductor device 40 with high mobility can be realized. On the other hand, in such an oxide semiconductor layer 540, oxygen contained in the oxide semiconductor layer 540 is easily reduced, and oxygen vacancies are easily formed in the oxide semiconductor layer 540.

In the semiconductor device 40, in a heat treatment process of the manufacturing process, hydrogen is released from a layer (for example, the gate insulating layers 510 and 520) provided closer to the substrate 500 than the oxide semiconductor layer 540, and the hydrogen reaches the oxide semiconductor layer 540, so that oxygen vacancies are generated in the oxide semiconductor layer 540. This generation of the oxygen vacancy is more pronounced as a pattern size of the oxide semiconductor layer 540 is larger. In order to suppress the generation of such oxygen vacancies, it is necessary to suppress the hydrogen from reaching the lower surface 542 of the oxide semiconductor layer 540. The above is the first issue.

Apart from the problems described above, there is the following second problem. The upper surface 541 of the oxide semiconductor layer 540 is affected by a process (for example, a patterning process or an etching process) after the oxide semiconductor layer 540 is formed. On the other hand, the lower surface 542 of the oxide semiconductor layer 540 (the surface of the oxide semiconductor layer 540 on the substrate 500 side) is not affected as described above.

Therefore, oxygen vacancies formed on the upper surface 541 of the oxide semiconductor layer 540 are larger than oxygen vacancies formed on the lower surface 542 of the oxide semiconductor layer 540. That is, the oxygen vacancies in the oxide semiconductor layer 540 are not uniformly present in a thickness direction of the oxide semiconductor layer 540, but are present in a non-uniform distribution in the thickness direction of the oxide semiconductor layer 540. Specifically, the oxygen vacancies in the oxide semiconductor layer 540 are smaller toward the lower surface 542 of the oxide semiconductor layer 540 and larger toward the upper surface 541 of the oxide semiconductor layer 540.

In the case where an oxygen supply process is uniformly performed on the oxide semiconductor layer 540 having the oxygen vacancy distribution as described above, when oxygen is supplied in an amount necessary for repairing the oxygen vacancy formed on the upper surface 541 side of the oxide semiconductor layer 540, oxygen is excessively supplied to the lower surface 542 side of the oxide semiconductor layer 540. As a result, on the lower surface 542 side, a defect level different from the oxygen vacancy is formed due to the excess oxygen, and a phenomenon such as a characteristic variation in the reliability test or a decrease in a field effect mobility occurs. Therefore, in order to suppress such a phenomenon, it is necessary to supply oxygen to the upper surface 541 side of the oxide semiconductor layer 540 while suppressing the supply of oxygen to the lower surface 542 side of the oxide semiconductor layer 540.

The problem described above is a newly recognized problem in the process leading to the present invention, and is not a problem that has been conventionally recognized. In the conventional configuration and manufacturing method, there is a relationship of a trade-off between the initial characteristics and the reliability test, in which the characteristic variation due to the reliability test occurs even if the initial characteristics of the semiconductor device are improved by the oxygen supply process to the oxide semiconductor layer. However, with the configuration according to the third embodiment, the problem described above is solved, and good initial characteristics and reliability test results of the semiconductor device 40 can be obtained.

[3-4. Manufacturing Method of Semiconductor Device 40]

A method of manufacturing the semiconductor device 40 will be described with reference to FIG. 20 to FIG. 29. Here, an example of a method of manufacturing the semiconductor device 40 in which aluminum oxide is used as the metal oxide layers 530 and 590 will be described.

Figure 21:
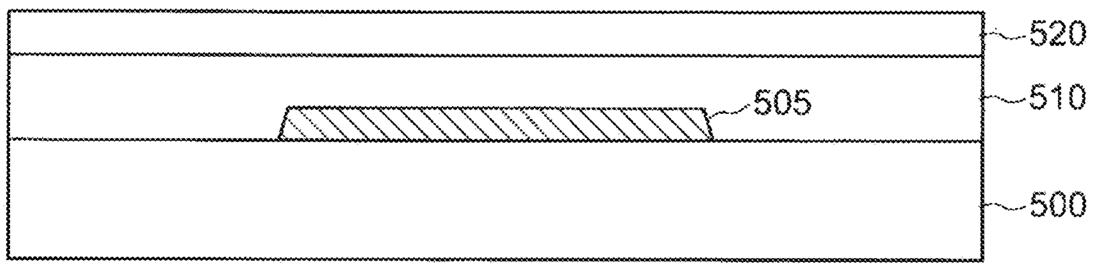
FIG. 21 is a cross-sectional view showing the method for manufacturing the semiconductor device according to the third embodiment of the present invention.

As shown in FIG. 20 and FIG. 21, a gate electrode 505 as a bottom gate is formed on the substrate 500, and gate insulating layers 510 and 520 are formed on the gate electrode 505 ("Bottom GI/GE formation" in step S2001 of FIG. 20). For example, silicon nitride is formed as the gate insulating layer 510. For example, silicon oxide is formed as the gate insulating layer 520. The gate insulating layers 510 and 520 are formed by a CVD (Chemical Vapor Deposition) method. One or both of the gate insulating layers 510 and 520 may be referred to as a "first insulating layer".

By using silicon nitride as the gate insulating layer 510, the gate insulating layer 510 can block impurities that diffuse from the substrate 500 side toward the oxide semiconductor layer 540, for example. The silicon oxide used as the gate insulating layer 520 is a physical silicon oxide that releases oxygen by a heat treatment.

Figure 22:
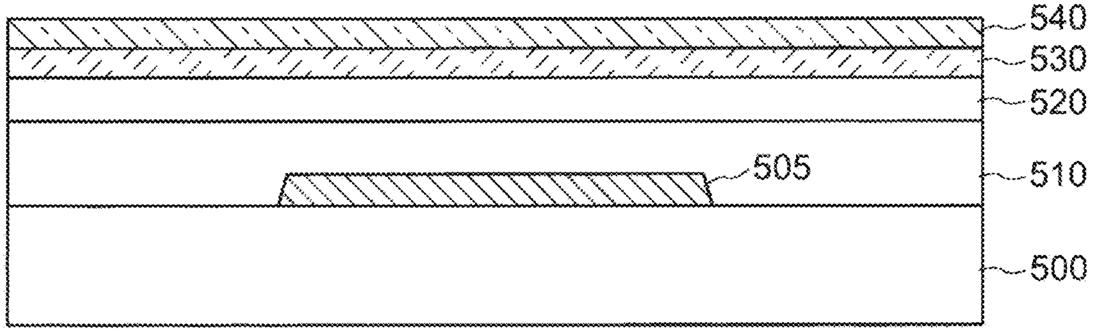
FIG. 22 is a cross-sectional view showing the method for manufacturing the semiconductor device according to the third embodiment of the present invention.

As shown in FIG. 20 and FIG. 22, the metal oxide layer 530 and the oxide semiconductor layer 540 are formed on the gate insulating layer 520 ("OS/$AlO_x$ film formation" in step S2002 of FIG. 20). This process may be referred to as a process in which the gate insulating layers 510 and 520 are formed on the substrate 500 and the metal oxide layer 530 is formed on the gate insulating layers 510 and 520. Alternatively, this process may be referred to as a process in which the metal oxide layer 530 is formed on the substrate 500 and the oxide semiconductor layer 540 is formed on the metal oxide layer 530. Specifically, the oxide semiconductor layer 540 is formed in contact with the metal oxide layer 530. The metal oxide layer 530 and the oxide semiconductor layer 540 are formed by a sputtering method or an atomic layer deposition method (ALD).

A thickness of the metal oxide layer 530 is, for example, 1 nm or more and 100 nm or less, 1 nm or more and 50 nm or less, 1 nm or more and 30 nm or less, or 1 nm or more and 10 nm or less. In the third embodiment, aluminum oxide is used as the metal oxide layer 530. Aluminum oxide has a high barrier property against gas. In the third embodiment, the aluminum oxide used as the metal oxide layer 530 blocks hydrogen and oxygen released from the gate insulating layer 520, and suppresses the released hydrogen and oxygen from reaching the oxide semiconductor layer 540.

A thickness of the oxide semiconductor layer 540 is, for example, 10 nm or more and 100 nm or less, 15 nm or more and 70 nm or less, or 20 nm or more and 40 nm or less. The oxide-semiconductor layers 540 prior to a heat treatment (OS annealing) described later are amorphous.

In the case where the oxide semiconductor layer 540 is crystallized by OS annealing to be described later, the oxide semiconductor layer 540 after a film formation and prior to OS annealing is preferably amorphous (with few crystalline components of the oxide semiconductor). That is, a film formation condition of the oxide semiconductor layer 540 is preferably a condition in which the oxide semiconductor layer 540 immediately after the film formation does not crystallize as much as possible. For example, in the case where the oxide semiconductor layer 540 is formed by a sputtering method, the oxide semiconductor layer 540 is formed while controlling a temperature of an object to be film-formed (the substrate 500 and the structure formed thereon).

If the film formation is performed on the object to be film-formed by a sputtering method, ions generated in a plasma and atoms recoiled by the sputtering target collide with the object to be film-formed, so that a temperature of the object to be film-formed increases with the film forming process. If the temperature of the object to be formed during the film forming process increases, microcrystals are contained in the oxide semiconductor layer 540 immediately after the film forming process, and crystallization due to subsequent OS annealing is inhibited. In order to control the temperature of the object to be film-formed as described above, for example, the film formation can be performed while cooling the object to be film-formed. For example, it is possible to cool the object to be film-formed from the other side of a surface to be film-formed so that the temperature of the surface to be film-formed of the object to be film-formed (hereinafter referred to as "film formation temperature") is 100° C. or less, 70° C. or less, 50° C. or less, or 30° C. or less. As described above, by forming the oxide semiconductor layer 540 while cooling the object to be film-formed, it is possible to form the oxide semiconductor layer 540 having a small crystal component in a state immediately after the film formation.

Figure 23:
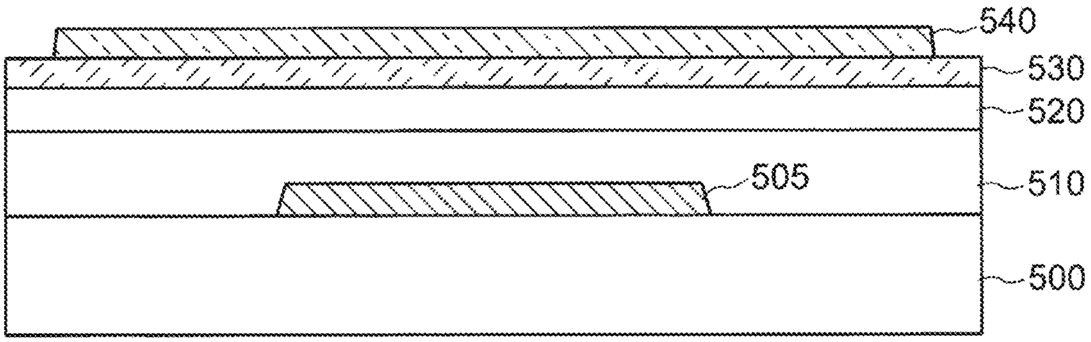
FIG. 23 is a cross-sectional view showing the method for manufacturing the semiconductor device according to the third embodiment of the present invention.

As shown in FIG. 20 and FIG. 23, a pattern of the oxide semiconductor layers 540 is formed ("OS patterning" in step S2003 of FIG. 20). Although not shown, a resist mask is formed on the oxide semiconductor layer 540, and the oxide semiconductor layer 540 is etched using the resist mask. The oxide semiconductor layer 540 may be etched using wet etching or dry etching. As the wet etching, etching can be performed using an acidic etchant. As the etchant, for example, oxalic acid or hydrofluoric acid can be used.

After the oxide semiconductor layer 540 is patterned, the oxide semiconductor layer 540 is subjected to the heat treatment (OS annealing) ("OS annealing" in step S2004 in FIG. 20). In the third embodiment, the oxide semiconductor layer 540 is crystallized by this OS annealing.

Figure 24:
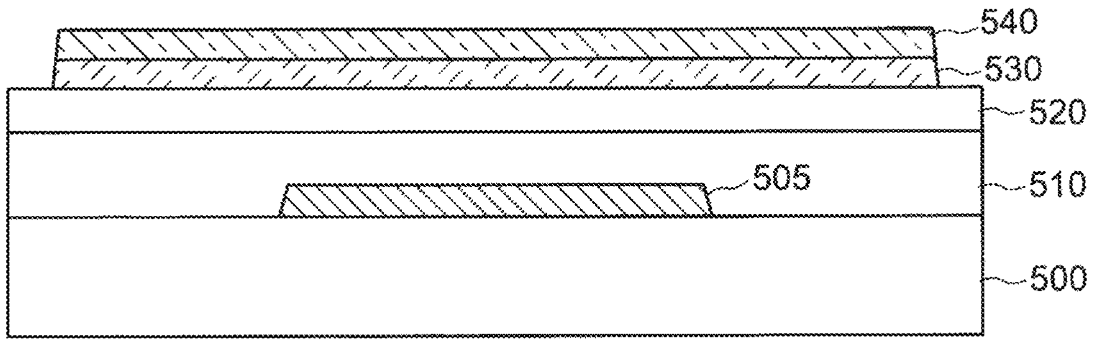
FIG. 24 is a cross-sectional view showing the method for manufacturing the semiconductor device according to the third embodiment of the present invention.

As shown in FIG. 20 and FIG. 24, a pattern of the metal oxide layer 530 is formed ("$AlO_x$ patterning" in step S2005 of FIG. 20). The metal oxide layer 530 is etched using the oxide semiconductor layer 540 patterned in the process described above as a mask. As the etching of the metal oxide layer 530, wet etching may be used, or dry etching may be used. For example, dilute hydrofluoric acid (DHF) is used as the wet etching. As described above, by etching the metal oxide layer 530 using the oxide semiconductor layer 540 as a mask, a photolithography process can be omitted.

Figure 25:
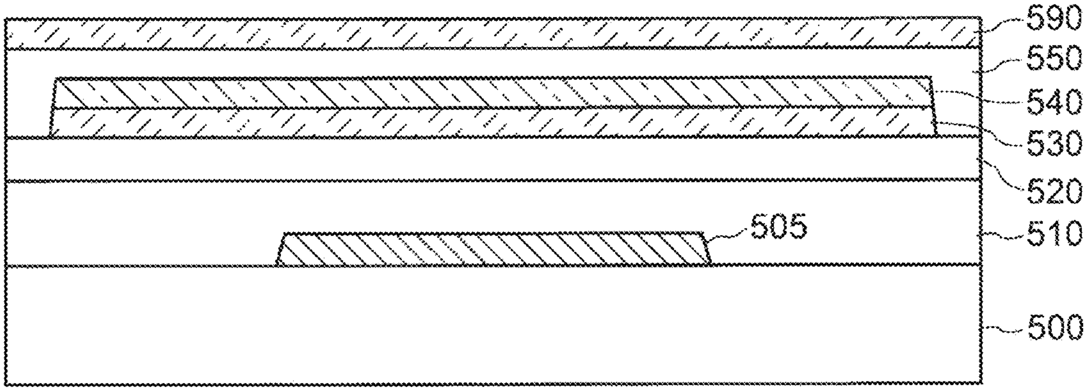
FIG. 25 is a cross-sectional view showing the method for manufacturing the semiconductor device according to the third embodiment of the present invention.

As shown in FIG. 20 and FIG. 25, the gate insulating layer 550 is deposited over the oxide semiconductor layer 540 ("GI formation" in step S2006 of FIG. 20). For example, silicon oxide is formed as the gate insulating layer 550. The gate insulating layer 550 is formed by the CVD method. For example, the gate insulating layer 550 may be formed at a film forming temperature of 350° C. or higher in order to form the insulating layer having less defects as the gate insulating layer 550. A thickness of the gate insulating layers 550 is, for example, 50 nm or more and 300 nm or less, 60 nm or more and 200 nm or less, or 70 nm or more and 150 nm or less. After the gate insulating layer 550 is formed, oxygen may be implanted into a portion of the gate insulating layer 550. The gate insulating layer 550 may be referred to as a "second insulating layer". The metal oxide layer 590 is formed on the gate insulating layer 550 ("$AlO_x$ film formation" in step S2007 in FIG. 20). The metal oxide layer 590 is formed by a sputtering method. Oxygen is implanted into the gate insulating layer 550 by forming the metal oxide layer 590.

A thickness of the metal oxide layer 590 is, for example, 5 nm or more and 100 nm or less, 5 nm or more and 50 nm or less, 5 nm or more and 30 nm or less, or 7 nm or more and 15 nm or less. In the third embodiment, aluminum oxide is used as the metal oxide layer 590. Aluminum oxide has a high barrier property against gas. In the third embodiment, aluminum oxide used as the metal oxide layer 590 suppresses oxygen implanted into the gate insulating layer 550 when the metal oxide layer 590 is formed from being diffused outward.

For example, in the case where the metal oxide layer 590 is formed by a sputtering method, a process gas used in sputtering remains in the film of the metal oxide layer 590. For example, in the case where Ar is used as the process gas for sputtering, Ar may remain in the film of the metal oxide layer 590. Residual Ar can be detected by a SIMS (Secondary Ion Mass Spectrometry) analysis on the metal oxide layer 590.

With the gate insulating layer 550 formed on the oxide semiconductor layer 540 and the metal oxide layer 590 formed on the gate insulating layer 550, a heat treatment for supplying oxygen (oxidation annealing) to the oxide semiconductor layer 540 is performed ("oxidation annealing" in step S2008 of FIG. 20). In other words, the metal oxide layer 530 and the oxide semiconductor layer 540 patterned as described above are subjected to the heat treatment (oxidation annealing). Many oxygen vacancies are generated on the upper surface 541 and the side surface 543 of the oxide semiconductor layer 540 in a process between the formation of the oxide semiconductor layer 540 and the formation of the gate insulating layer 550 on the oxide semiconductor layer 540. Oxygen released from the gate insulating layers 520 and 550 is supplied to the oxide semiconductor layer 540 by the oxidation annealing, and the oxygen vacancies are repaired.

Oxygen emitted from the gate insulating layer 520 by the oxidation annealing is blocked by the metal oxide layer 530, and thus oxygen is hardly supplied to the lower surface 542 of the oxide semiconductor layer 540. Oxygen emitted from the gate insulating layer 520 diffuses from a region where the metal oxide layer 530 is not formed to the gate insulating layer 550 provided on the gate insulating layer 520, and reaches the oxide semiconductor layer 540 via the gate insulating layer 550. As a result, the oxygen emitted from the gate insulating layer 520 is hardly supplied to the lower surface 542 of the oxide semiconductor layer 540, and is mainly supplied to the side surface 543 and the upper surface 541 of the oxide semiconductor layer 540. Further, oxygen emitted from the gate insulating layer 550 is supplied to the upper surface 541 and the side surface 543 of the oxide semiconductor layer 540 by oxidation annealing. Although there is a case where hydrogen is released from the gate insulating layers 510 and 520 by the oxidation annealing, the hydrogen is blocked by the metal oxide layer 530.

As described above, by the process of the oxidation annealing, it is possible to supply oxygen to the upper surface 541 and the side surface 543 of the oxide semiconductor layer 540 having a large amount of oxygen vacancies while suppressing the supply of oxygen to the lower surface 542 of the oxide semiconductor layer 540 having a small amount of oxygen vacancies.

Similarly, in the oxidation annealing described above, oxygen implanted in the gate insulating layer 550 is blocked by the metal oxide layer 590, and thus is suppressed from being released into the atmosphere. Accordingly, the oxygen is efficiently supplied to the oxide semiconductor layer 540 by the oxidation annealing, and the oxygen vacancies are repaired.

Figure 26:
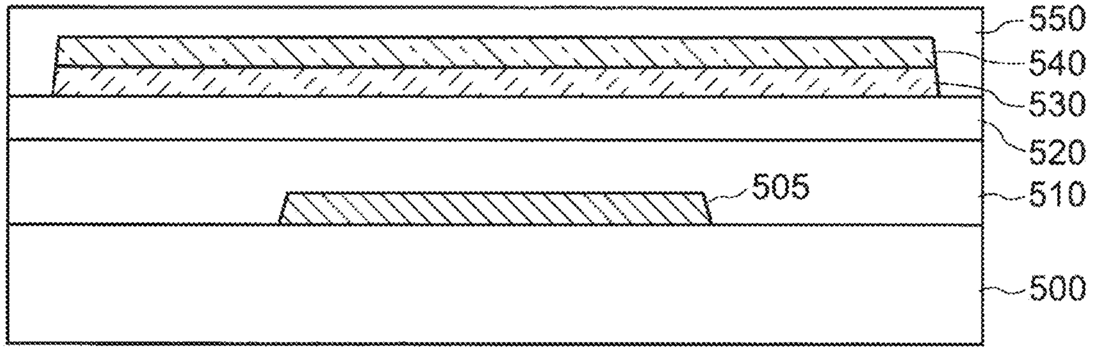
FIG. 26 is a cross-sectional view showing the method for manufacturing the semiconductor device according to the third embodiment of the present invention.

As shown in FIG. 20 and FIG. 26, after the oxidation annealing, the metal oxide layer 590 is etched (removed) ("$AlO_x$ removal" in step S2009 of FIG. 20). As the etching of the metal oxide layer 590, wet etching may be used, or dry etching may be used. For example, dilute hydrofluoric acid (DHF) is used as the wet etching. By the etching, the metal oxide layer 590 formed on the entire surface is removed. In other words, the metal oxide layer 590 is removed without using a mask. In other words, all the metal oxide layer 590 in the region overlapping the oxide semiconductor layer 540 formed in one pattern is removed by the etching at least in a plan view.

Figure 27:
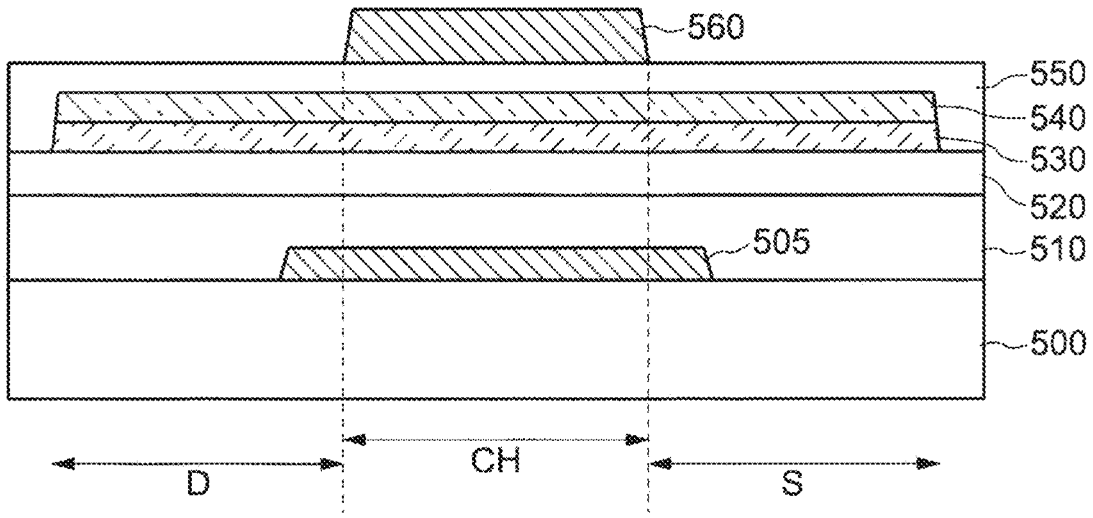
FIG. 27 is a cross-sectional view showing the method for manufacturing the semiconductor device according to the third embodiment of the present invention.

As shown in FIG. 20 and FIG. 27, the gate electrode 560 is formed on the gate insulating layer 550 ("GE formation" in step S2010 of FIG. 20). The gate electrode 560 is formed by a sputtering method or an atomic layer deposition method, and is patterned through a photolithography process. As described above, the gate electrode 560 is formed so as to be in contact with the gate insulating layer 550 exposed by removing the metal oxide layer 590.

With the gate electrode 560 patterned, a resistance of the source region S and the drain region D of the oxide semiconductor layer 540 is reduced ("SD resistance reduction" in step S2011 of FIG. 20). Specifically, impurities are implanted from the gate electrode 560 side to the oxide semiconductor layer 540 via the gate insulating layer 550 by ion implantation. By the ion implantation, for example, argon (Ar), phosphorus (P), and boron (B) are implanted into the oxide semiconductor layers 540. Oxygen vacancies are formed in the oxide semiconductor layer 540 by the ion implantation, thereby reducing the resistance of the oxide semiconductor layer 540. Since the gate electrode 560 is provided above the oxide semiconductor layer 540 functioning as the channel region CH of the semiconductor device 40, no impurities are implanted into the oxide semiconductor layer 540 on the channel region CH.

Figure 28:
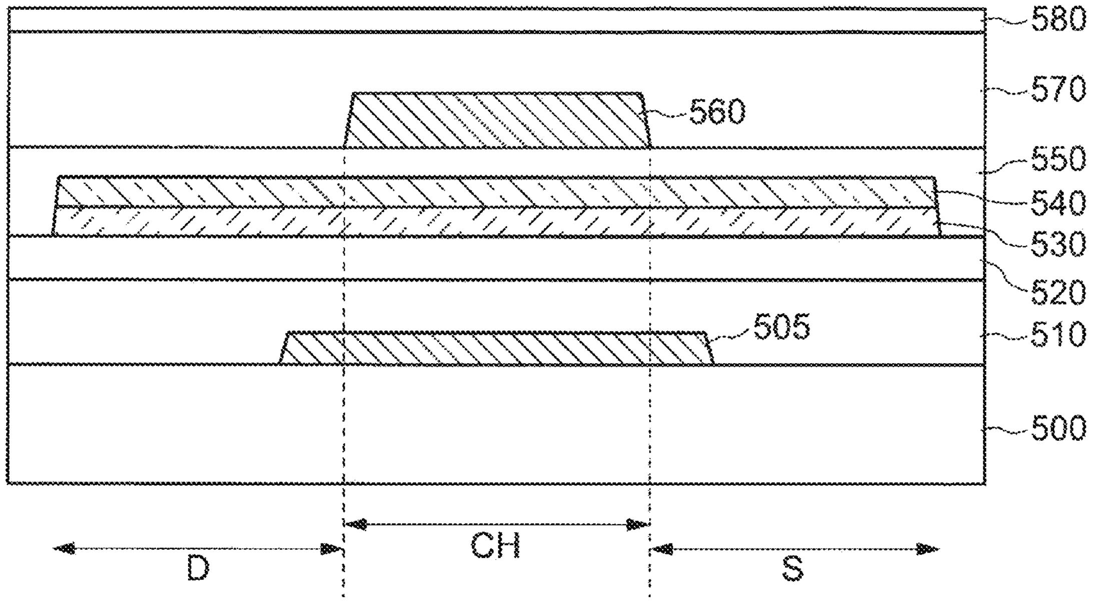
FIG. 28 is a cross-sectional view showing the method for manufacturing the semiconductor device according to the third embodiment of the present invention.

As shown in FIG. 20 and FIG. 28, the insulating layers 570 and 580 are formed as interlayer films on the gate insulating layer 550 and the gate electrode 560 ("interlayer film formation" in step S2012 of FIG. 20). The insulating layers 570 and 580 are formed by the CVD method. For example, silicon nitride is formed as the insulating layer 570, and silicon oxide is formed as the insulating layer 580. The materials used for the insulating layers 570 and 580 are not limited to the above. A thickness of the insulating layers 570 is 50 nm or more and 500 nm or less. A thickness of the insulating layers 580 is 50 nm or more and 500 nm or less.

Figure 29:
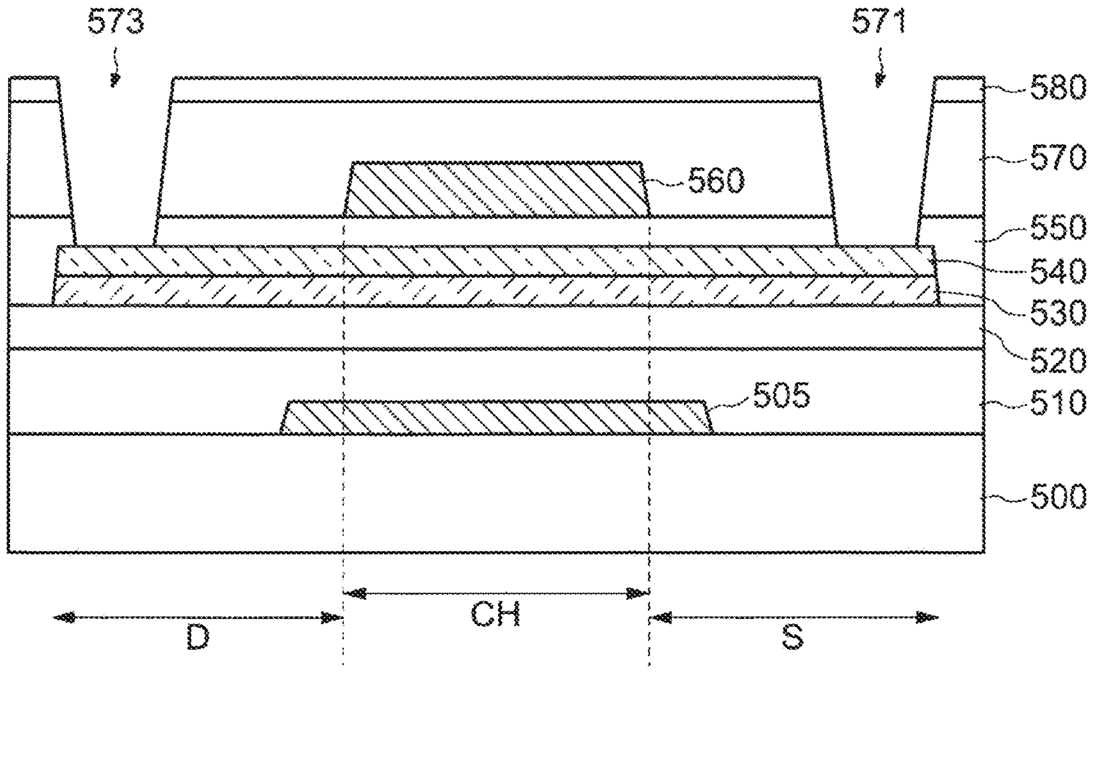
FIG. 29 is a cross-sectional view showing the method for manufacturing the semiconductor device according to the third embodiment of the present invention.

As shown in FIG. 20 and FIG. 29, the openings 571 and 573 are formed in the gate insulating layer 550 and the insulating layers 570 and 580 ("contact openings" in step S2013 of FIG. 20). The opening 571 exposes the oxide semiconductor layer 540 in the source region S. The opening 573 exposes the oxide semiconductor layer 540 in the drain region D. By forming the source/drain electrode 200 on the oxide semiconductor layer 540 and the insulating layer 580 exposed by the openings 571 and 573 ("SD formation" in step S2044 in FIG. 20), the semiconductor device 40 shown in FIG. 20 is completed.

In the semiconductor device 40 manufactured by the manufacturing method described above, in a range where the channel length L of the channel region CH is 2 μm or more and 4 μm or less, and the channel width W of the channel region CH is 2 μm or more and 25 μm or less, an electric property having a mobility of 50 $cm^2/Vs$ or more, 55 $cm^2/Vs$ or more, or 60 $cm^2/Vs$ or more can be obtained. A mobility in the third embodiment is a field effect mobility in a saturation region of the semiconductor device 40. The mobility in the third embodiment means a maximum value of the field effect mobility in a region (that is, the saturation region) in which a potential difference (Vds) between the source electrode and the drain electrode is larger than a value (Vg-Vth) obtained by subtracting a threshold voltage (Vth) of the semiconductor device 40 from a voltage (Vg) supplied to the gate electrode.

[3-5. Example of Electrical Characteristics of Semiconductor Device 40]

An example of the electrical characteristics of the semiconductor device will be mainly described with reference to FIG. 30 and FIG. 31. The semiconductor device 40 is used for a channel region CH of a second transistor OT2 in the pixel circuit shown in FIG. 31. For example, the second transistor OT2 is a transistor called a driving transistor. In FIG. 30, the present disclosure is described as Present Application, and a comparative example is described as Prior Art. A configuration of the pixel circuit of the present invention is the same as that of the pixel circuit of the comparative example, and the second transistor OT2 and the light emitting element OLED of the present invention correspond to a second transistor TR and a light emitting element POLED of the comparative example. On the other hand, the channel region CH of the second transistor OT2 of the present invention is formed using the oxide semiconductor layer 540, whereas a channel region of the second transistor TR of the comparative example is formed using, for example, a low-temperature polysilicon layer (LTPS layer) or an oxide semiconductor layer having properties differing from those of the oxide semiconductor layer 540.

In addition, a pixel circuit 183 according to the third embodiment shown in FIG. 31 is a circuit in which the second transistor T2 of the pixel circuit 182 according to the second embodiment described with reference to FIG. 15 is replaced with the second transistor OT2 formed using the semiconductor device 40. Configurations and functions of the pixel circuit 183 according to the third embodiment other than the second transistor OT2 are the same as the configuration and function of the pixel circuit 182 according to the second embodiment described with reference to FIG. 15.

Therefore, in the third embodiment, the second transistor OT2 will be mainly described, and a description of configurations and functions other than the second transistor OT2 will be omitted. In the pixel circuit according to the third embodiment shown in FIG. 31, the channel regions of the transistors (the first transistor T1, the third transistor T3 to the sixth transistor T6) other than the second transistor OT2 are formed using, for example, a low-temperature polysilicon layer (LTPS layer).

FIG. 30 is a diagram showing a dependency of a drain current IOT2 on a drain voltage (voltage VANODE) of the second transistor OT2, and shows a dependency of the voltage VANODE of the light emitting element OLED and a current IDI flowing through the light emitting element OLED. FIG. 30 also shows a dependency of the drain current IOT2 on a drain voltage (voltage VANODE) of the second transistor TR and a dependency of a voltage VANODE of the light emitting element POLED and the current IDI flowing through the light emitting element OLED. Further, in FIG. 30, at a border between a linear region and a saturated region, a source-drain voltage (for example, the potential difference (Vds) between the source electrode and the drain electrode) is the same as the potential difference (Vgs) between the gate electrode and the source electrode minus the threshold voltage (Vth) of the semiconductor device (Vgs−Vth).

As shown in FIG. 30, at an operation point (a point at which a curve of the second transistor OT2 and a curve of the light emitting element OLED intersect) 50 of the present invention using the semiconductor device 40, the drain voltage is smaller and the drain current is larger than an operation point (a point at which a curve of the second transistor TR and a curve of the light emitting element POLED intersect) of the comparative example 50P.

That is, the second transistor OT2 is capable of supplying the same current as the second transistor TR with a gate-source voltage Vgs smaller than the second transistor TR. Therefore, the second transistor OT2 can be driven in the saturated range using the source-drain voltage Vds smaller than the second transistor TR. As a result, by using the semiconductor device 40, the pixel circuit of the present invention can be driven at a lower voltage than the pixel circuit of the comparative example.

By using the semiconductor device 40, a potential difference between the voltages supplied to the first driving power line PVDD and the reference potential line PVSS of the pixel circuit (a potential difference between the driving voltage VDDEL and the reference voltage VSSEL) can be set to be small. The self-luminous display device using the semiconductor device 40 can reduce power consumption because the power supply voltage can be reduced.

As the embodiment of the present invention, each of the embodiments described above or a part of each of the embodiments described above can be appropriately combined as long as they do not conflict with each other.

It is to be understood that the present invention provides other functional effects that are different from the operational effects provided by the aspects of the embodiments described above, and those that are obvious from the description of the present specification or those that can be easily predicted by a person skilled in the art.

What is claimed is:

1. A display device comprising:

a pixel including first to sixth transistors and a light emitting element, wherein the first transistor is configured to be controlled using a second control signal obtained by shifting a first control signal, and is electrically connected between an image data signal line and a first node;

the second transistor is electrically connected between the first node and a second node, the third transistor is configured to be controlled using the first control signal, and electrically is connected between the second node and a gate electrode of the second transistor, the fourth transistor is configured to be controlled using a fourth control signal obtained by shifting a third control signal, and is electrically connected between a driving power supply line supplied with a driving voltage and the second node, the fifth transistor is configured to be controlled using the third control signal, and is electrically connected to the first node, the sixth transistor is configured to be controlled using the third control signal to supply an initialization voltage to the light emitting element and a first electrode of the fifth transistor, and is connected to the light emitting element and the first electrode, and the light emitting element is electrically connected to the first electrode.

2. The display device according to claim 1, further comprising a control circuit shifting and outputting the first control signal and the second control signal; and a light emission control circuit shifting and outputting the third control signal and the fourth control signal.

3. The display device according to claim 2, wherein the first to fifth transistors are n-channel field effect transistors, and the sixth transistor is a p-channel field effect transistor.

4. The display device according to claim 3, wherein the control circuit is configured to supply a high level to the first control signal to turn on the third transistor, and is configured to supply a low level to the second control signal to turn off the first transistor, the light emission control circuit is configured to supply a low level to the third control signal to turn off the fifth transistor and turn on the sixth transistor, and is configured to supply a high level to the fourth control signal to turn on the fourth transistor, the fourth transistor and the third transistor are configured to supply the driving voltage to the second node and the gate electrode, and the sixth transistor is configured to supply the initialization voltage to the light emitting element and the first electrode.

5. The display device according to claim 3, wherein the control circuit is configured to supply a high level to the first control signal to turn on the third transistor, and is configured to supply a high level to the second control signal to turn on the first transistor, the light emission control circuit is configured to supply a low level to the third control signal to turn off the fifth transistor and turn on the sixth transistor, and is configured to supply a low level to the fourth control signal to turn off the fourth transistor, and the first transistor is configured to supply an image data signal from the image data signal line to the first node, the second node and the gate electrode.

6. The display device according to claim 3, wherein the control circuit is configured to supply a low level to the first control signal to turn off the third transistor, and is configured to supply a low level to the second control signal to turn on the first transistor, the light emission control circuit is configured to supply a low level to the third control signal to turn off the fifth transistor and turn on the sixth transistor, and the sixth transistor is configured to supply an image data signal including a voltage for displaying black from the image data signal line to the first electrode and the light emitting element.

7. The display device according to claim 2, wherein the first to third transistors and the sixth transistor are n-channel field effect transistors, and the fourth and fifth transistors are p-channel field effect transistors.

8. The display device according to claim 7, wherein the control circuit is configured to supply a high level to the first control signal to turn on the third transistor, and is configured to supply a low level to the second control signal to turn off the first transistor, the light emission control circuit is configured to supply a high level to the third control signal to turn off the fifth transistor and turn on the sixth transistor, and is configured to supply a low level to the fourth control signal to turn on the fourth transistor, the fourth transistor and the third transistor are configured to supply the driving voltage to the second node and the gate electrode, and the sixth transistor is configured to supply the initialization voltage to the light emitting element and the first electrode.

9. The display device according to claim 7, wherein the control circuit is configured to supply a high level to the first control signal to turn on the third transistor, and configured to supply a high level to the second control signal to turn on the first transistor, the light emission control circuit is configured to supply a high level to the third control signal to turn off the fifth transistor and turn on the sixth transistor, and is configured to supply a high level to the fourth control signal to turn off the fourth transistor, and the first transistor is configured to supply an image data signal from the image data signal line to the first node, the second node and the gate electrode.

10. The display device according to claim 7, wherein the control circuit is configured to supply a low level to the first control signal to turn off the third transistor, and is configured to supply a low level to the second control signal to turn off the first transistor, the light emission control circuit is configured to supply a high level to the third control signal to turn off the fifth transistor and turn on the sixth transistor, and the sixth transistor is configured to supply an image data signal including a voltage for displaying black from the image data signal line to the first electrode and the light emitting element.

11. The display device according to claim 7, wherein a channel region of each of the fourth transistor, the fifth transistor and the sixth transistor include a low temperature polysilicon, and a channel region of the second transistor includes an oxide semiconductor.

12. A driving method of display device, the display device comprising:

a pixel including first to sixth transistors and a light emitting element, wherein the first transistor is electrically connected at least between an image data signal line and a first node, the second transistor is electrically connected between the first node and a second node, the third transistor is electrically connected between the second node and a gate electrode of the second transistor, the fourth transistor is electrically connected to the second node, the fifth transistor is electrically connected to the first node, the sixth transistor is connected to the light emitting element and a first electrode of the fifth transistor, and the light emitting element is electrically connected to the first electrode, and the driving method includes the steps of:

shifting and outputting a first control signal and a second control signal, sequentially;

shifting and outputting a third control signal and a fourth control signal, sequentially;

controlling the third transistor using the first control signal;

controlling the first transistor using the second control signal;

controlling the fifth and sixth transistors using the third control signal; and controlling the fourth transistor using the fourth control signal.

13. The driving method according to claim 12, wherein the first to fifth transistors are n-channel field effect transistors, and the sixth transistor is a p-channel field effect transistor.

14. The driving method according to claim 13, wherein the third transistor is turned on by supplying a high level to the first control signal, the first transistor is turned off by supplying a low level to the second control signal, the fifth transistor is turned off and the sixth transistor is turned on by supplying a low level to the third control signal, the fourth transistor is turned on by supplying a high level to the fourth control signal, a driving voltage is supplied to the second node and the gate electrode via the fourth transistor and the third transistor, and an initialization voltage is supplied to the light emitting element and the first electrode via the sixth transistor.

15. The driving method according to claim 13, wherein the third transistor is turned on by supplying a high level to the first control signal, the first transistor is turned on by supplying a high level to the second control signal, the fifth transistor is turned off and the sixth transistor is turned on by supplying a low level to the third control signal, the fourth transistor is turned off by supplying a low level to the fourth control signal, and an image data signal is supplied to the first node, the second node and the gate electrode from the image data signal line via the first transistor.

16. The driving method according to claim 13, wherein the third transistor is turned off by supplying a low level to the first control signal, the first transistor is turned off by supplying a low level to the second control signal, the fifth transistor is turned off and the sixth transistor is turned on by supplying a low level to the third control signal, and an image data signal including a voltage for displaying black is supplied to the first electrode and the light emitting element from the image data signal line via the first transistor.

17. The driving method according to claim 12, wherein the first to third transistors and the sixth transistor are n-channel field effect transistors, and the fourth and fifth transistors are a p-channel field effect transistor.

18. The driving method according to claim 17, wherein the third transistor is turned on by supplying a high level to the first control signal, the first transistor is turned off by supplying a low level to the second control signal, the fifth transistor is turned off and the sixth transistor is turned on by supplying a high level to the third control signal, the fourth transistor is turned on by supplying a low level to the fourth control signal, a driving voltage is supplied to the second node and the gate electrode via the fourth transistor and the third transistor, and an initialization voltage is supplied to the light emitting element and the first electrode via the sixth transistor.

19. The driving method according to claim 17, wherein the third transistor is turned on by supplying a high level to the first control signal, the first transistor is turned on by supplying a high level to the second control signal, the fifth transistor is turned off and the sixth transistor is turned on by supplying a high level to the third control signal, the fourth transistor is turned off by supplying a high level to the fourth control signal, and an image data signal is supplied to the first node, the second node and the gate electrode from the image data signal line via the first transistor.

20. The driving method according to claim 17, wherein the third transistor is turned off supplying a low level to the first control signal, the first transistor is turned off by supplying a low level to the second control signal, the fifth transistor is turned off and the sixth transistor is turned on by supplying a high level to the third control signal, and an image data signal including a voltage for displaying black is supplied to the first electrode and the light emitting element from the image data signal line via the first transistor.

* * * * *